United States Patent
Blankenship et al.

(10) Patent No.: US 10,057,896 B2
(45) Date of Patent: Aug. 21, 2018

(54) RESOLVING COLLIDING SIGNALS

(71) Applicant: Telefonaktiebolaget LM Ericsson (publ), Stockholm (SE)

(72) Inventors: Yufei Blankenship, Kildeer, IL (US); Mattias Frenne, Uppsala (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 73 days.

(21) Appl. No.: 15/092,235

(22) Filed: Apr. 6, 2016

(65) Prior Publication Data

US 2016/0302175 A1    Oct. 13, 2016

Related U.S. Application Data

(60) Provisional application No. 62/145,375, filed on Apr. 9, 2015.

(51) Int. Cl.
*H04W 72/04* (2009.01)
*H04W 4/70* (2018.01)
(Continued)

(52) U.S. Cl.
CPC ......... *H04W 72/042* (2013.01); *H04L 5/0044* (2013.01); *H04L 5/0096* (2013.01);
(Continued)

(58) Field of Classification Search
CPC .......... H04L 5/00; H04W 72/04; H04W 4/00; H04W 24/00; H04W 4/005; H04W 72/042; H04B 7/14
See application file for complete search history.

(56) References Cited

U.S. PATENT DOCUMENTS

2011/0111781 A1\* 5/2011 Chen ................. H04B 7/02
455/507
2011/0252139 A1\* 10/2011 Bhattad ............. H04L 1/0013
709/226

(Continued)

OTHER PUBLICATIONS

Intel Corporation, "R1-122651: Further Details about ePDCCH Search Space," 3rd Generation Partnership Project (3GPP), TSG RAN WG1 Meeting #69, May 21-25, 2012, 4 pages, Prague, Czech Republic.

(Continued)

*Primary Examiner* — Mohamed Kamara
(74) *Attorney, Agent, or Firm* — Withrow & Terranova, PLLC

(57) ABSTRACT

Systems and methods are disclosed herein that relate to transmitting and receiving a transmission when there is a collision between the transmission and reserved resource elements. In some embodiments, a radio access node for a cellular communications network is disclosed, wherein the radio access node comprises a transceiver, a processor, and memory storing instructions executable by the processor whereby the radio access node is operable to transmit, via the transceiver, a downlink transmission to a wireless device using one or more Physical Resource Blocks (PRBs) that comprise reserved Resource Elements (REs) by puncturing the downlink transmission at positions of the reserved REs. In some embodiments, the downlink transmission is an Enhanced Physical Downlink Control Channel (EPDCCH) transmission or a Physical Downlink Shared Channel (PDSCH) transmission. Further, in some embodiments, the reserved REs are REs utilized for one or more CSI-RSs.

33 Claims, 15 Drawing Sheets

(51) Int. Cl.
  *H04W 4/00* (2018.01)
  *H04L 5/00* (2006.01)
(52) U.S. Cl.
  CPC .............. *H04W 4/005* (2013.01); *H04W 4/70* (2018.02); *H04L 5/005* (2013.01); *H04L 5/0007* (2013.01)

(56) References Cited

U.S. PATENT DOCUMENTS

| | | | | |
|---|---|---|---|---|
| 2014/0204854 | A1* | 7/2014 | Freda | H04L 1/18 370/329 |
| 2014/0211739 | A1* | 7/2014 | Kim | H04L 5/0053 370/329 |
| 2014/0301336 | A1* | 10/2014 | Kim | H04L 5/001 370/329 |
| 2014/0334397 | A1* | 11/2014 | Chen | H04W 72/042 370/329 |
| 2015/0195817 | A1* | 7/2015 | Sathananthan | H04W 72/042 370/329 |
| 2015/0230211 | A1* | 8/2015 | You | H04L 5/0051 370/330 |
| 2016/0105248 | A1* | 4/2016 | Lunttila | H04B 17/345 370/252 |

OTHER PUBLICATIONS

Motorola Mobility, "R1-122663: Handling mapping of EPDCCH in presence of other signals," 3rd Generation Partnership Project (3GPP), TSG RAN1#69, May 21-25, 2012, 4 pages, Prague, Czech Republic.

International Search Report and Written Opinion for International Patent Application No. PCT/IB2016/051988, dated Aug. 25, 2016, 17 pages.

Author Unknown, "Technical Specification Group Radio Access Network; Evolved Universal Terrestrial Radio Access (E-UTRA); Physical channels and modulation (Release 11)," Technical Specification 36.211, Version 11.6.0, Sep. 2014, 3GPP Organizational Partners, 120 pages.

Author Unknown, "Technical Specification Group Radio Access Network; Evolved Universal Terrestrial Radio Access (E-UTRA); Physical channels and modulation (Release 12)," Technical Specification 36.211, Version 12.0.0, Dec. 2013, 3GPP Organizational Partners, 120 pages.

Author Unknown, "Technical Specification Group Radio Access Network; Evolved Universal Terrestrial Radio Access (E-UTRA); Physical layer procedures (Release 11)," Technical Specification 36.213, Version 11.11.0, Jun. 2015, 3GPP Organizational Partners, 183 pages.

Author Unknown, "Technical Specification Group Radio Access Network; Evolved Universal Terrestrial Radio Access (E-UTRA); Physical layer procedures (Release 12)," Technical Specification 36.213, Version 12.0.0, Dec. 2013, 3GPP Organizational Partners, 186 pages.

Author Unknown, "Technical Specification Group Radio Access Network; Study on provision of low-cost Machine-Type Communications (MTC) User Equipments (UEs) based on LTE (Release 12)," Technical Report 36.888, Version 12.0.0, Jun. 2013, 3GPP Organizational Partners, 55 pages.

* cited by examiner

RESOLVING COLLIDING SIGNALS

RELATED APPLICATIONS

This application claims the benefit of provisional patent application Ser. No. 62/145,375, filed Apr. 9, 2015, the disclosure of which is hereby incorporated herein by reference in its entirety.

TECHNICAL FIELD

The present disclosure relates to resolving colliding signals during reception of a downlink transmission.

BACKGROUND

Third Generation Partnership Project (3GPP) Long Term Evolution (LTE) technology is a mobile broadband wireless communication technology in which transmissions from base stations (referred to as enhanced or evolved Node Bs (eNBs)) to mobile stations (referred to as User Equipment devices (UEs)) are sent using Orthogonal Frequency Division Multiplexing (OFDM). OFDM splits the signal into multiple parallel sub-carriers in frequency. The basic unit of transmission in LTE is a Resource Block (RB), which in its most common configuration consists of 12 subcarriers and 7 OFDM symbols (one slot). A unit of one subcarrier and 1 OFDM symbol is referred to as a Resource Element (RE). Thus, an RB consists of 84 REs. In this regard, FIG. 1 is a schematic diagram showing LTE physical resources.

In the time domain, LTE downlink transmissions are organized into radio frames of 10 milliseconds (ms), each radio frame consisting of ten equally-sized subframes of length $T_{subframe}=1$ ms, as illustrated in FIG. 2. FIG. 3 is a schematic diagram of a downlink subframe. An LTE radio subframe is composed of multiple RBs in frequency with the number of RBs determining the bandwidth of the system and two slots in time. The two RBs in a subframe that are adjacent in time are denoted as an RB pair.

The signal transmitted by the eNB in a downlink subframe (downlink being the link carrying transmissions from the eNB to the UE) may be transmitted from multiple antennas, and the signal may be received at a UE that has multiple antennas. The radio channel distorts the transmitted signals from the multiple antenna ports. In order to demodulate any transmissions on the downlink, a UE relies on Reference Signals (RSs) that are transmitted on the downlink. These RSs and their position in the time-frequency grid are known to the UE and hence can be used to determine channel estimates by measuring the effect of the radio channel on these symbols.

Machine Type Communication (MTC)

3GPP LTE has been investigated as a competitive radio access technology for efficient support of MTC. Lowering the cost of MTC UEs can facilitate the implementation of the concept of the "Internet of Things." MTC UEs used for many applications will require low operational power consumption and are expected to communicate with infrequent small burst transmissions. In addition, there is a substantial market for the Machine-to-Machine (M2M) use cases of devices deployed deep inside buildings which would require coverage enhancement in comparison to the defined LTE cell coverage footprint.

3GPP LTE Release 12 (Rel-12) has defined a UE Power Saving Mode (PSM) allowing long battery lifetime and a new UE category allowing reduced modem complexity. In Release 13 (Rel-13), continued MTC work is expected to further reduce UE cost and provide coverage enhancement. The key element to enable cost reduction is to introduce a reduced UE Radio Frequency (RF) bandwidth of, e.g., 1.4 Megahertz (MHz) (which corresponds to 6 RBs) in downlink and uplink within any system bandwidth. There is further discussion of Narrowband-IoT (NB-IoT), which utilizes a bandwidth of 1 RB within any system bandwidth.

As a result of utilizing only a small bandwidth within the overall system bandwidth, these MTC devices will be unable to receive the conventional Physical Downlink Control Channel (PDCCH), which spans the entire system bandwidth within the first few symbol periods of each downlink subframe. As such, these MTC devices will only be able to receive the Enhanced PDCCH (EPDCCH), which is transmitted within the data region of the downlink subframes.

Enhanced Control Signaling in LTE-EPDCCH

Messages transmitted over the radio link to UEs can be broadly classified as control messages or data messages. Control messages are used to facilitate the proper operation of the system as well as the proper operation of each UE within the system. Control messages can include commands to control functions such as the transmitted power from a UE, signaling of RBs within which the data is to be received by the UE or transmitted from the UE, and so on.

In LTE Release 8 (Rel-8), the first one to four OFDM symbols, depending on the configuration, in a subframe are reserved to contain such control information (see FIG. 3). For normal (non-MTC) UEs of Release 11 (Rel-11) or later, the UE can be configured to monitor EPDCCH in addition to PDCCH, as specified in 3GPP Technical Specification (TS) 36.211 V11.6.0 and 3GPP TS 36.213 V11.11.0. The EPDCCH was thus introduced in Rel-11, in which 2, 4, or 8 Physical RB (PRB) pairs in the data region are reserved to exclusively contain EPDCCH transmissions, although the one to four first symbols that may contain control information to UEs of releases earlier than Rel-11 are excluded from the PRB pairs for EPDCCH transmissions.

FIG. 4 is a schematic diagram of a downlink subframe showing ten RB pairs and configuration of three EPDCCH regions of size 1 PRB pair each. Note that FIG. 4 is for conceptual illustration only, as the current LTE specifications for EPDCCH do not support an EPDCCH region of size 1 PRB pair. The remaining PRB pairs that are not used for EPDCCH transmissions can be used for Physical Downlink Shared Channel (PDSCH) transmissions. Thus, the EPDCCH is frequency multiplexed with PDSCH transmissions contrary to PDCCH which is time multiplexed with PDSCH transmissions. Note also that multiplexing of PDSCH and any EPDCCH transmission within a PRB pair is not supported in LTE Rel-11.

Furthermore, two modes of EPDCCH transmission are supported. These two modes of EPDCCH transmission are referred to as localized EPDCCH transmission and distributed EPDCCH transmission. In distributed EPDCCH transmission, an EPDCCH is mapped to REs in up to D PRB pairs, where D=2, 4, or 8. In this way, frequency diversity can be achieved for the EPDCCH message. FIG. 5 is an illustration of the concept of distributed EPDCCH transmission. In particular, FIG. 5 illustrates a downlink subframe showing four parts, or enhanced Resource Element Groups (eREGs), belonging to an EPDCCH that are mapped to multiple enhanced control regions (EPDCCH regions) in an EPDCCH set to thereby achieve distributed transmission and frequency diversity.

In localized EPDCCH transmission, an EPDCCH is mapped to one or two PRB pairs only. For lower aggregation levels, only one PRB pair is used. If the aggregation level of the EPDCCH is too large to fit the EPDCCH in one PRB pair, the second PRB pair is used as well. FIG. 6 is an illustration of localized EPDCCH transmission. In particular, FIG. 6 illustrates a downlink subframe showing four enhanced Control Channel Elements (eCCEs) belonging to an EPDCCH, which is mapped to one of the enhanced control regions to achieve localized transmission.

To facilitate the mapping of eCCEs to physical resources, each PRB pair is divided into 16 eREGs and each eCCE is further divided into $N_{eREG}^{eCCE}=4$ or $N_{eREG}^{eCCE}=8$ eREGs. For normal Cyclic Prefix (CP) and normal subframes, $N_{eREG}^{eCCE}=4$ unless some conditions are met, as described in 3G PP TS 36.213. For extended CP and in some special subframes for frame structure 2 (Time Division Duplexing (TDD)), $N_{eREG}^{eCCE}=8$ is used. An EPDCCH is consequently mapped to a multiple of four or eight eREGs depending on the aggregation level.

These eREGs belonging to an EPDCCH reside in either a single PRB pair (as is typical for localized transmission) or a multiple of PRB pairs (as is typical for distributed transmission). The division of a PRB pair of normal CP configuration in a normal subframe into eREGs is illustrated in FIG. 7. As illustrated, the shaded, unlabeled squares represent REs that contain Demodulation Reference Signals (DMRSs). Each labelled square, or tile, is a RE in which the number corresponds to the eREG to which the RE belongs. The squares labelled with the same number, or index, belong to the same eREG, which is indexed with the number. For example, the REs labelled "0" correspond to the REs belonging to the eREG indexed with 0.

The EPDCCH uses DMRS, for demodulation, which is shown in 7. There are 24 REs reserved for DMRS per PRB pair. For distributed EPDCCH, there are two DMRS antenna ports in each PRB pair, for normal CP, known as antenna ports 107 and 109. These two antenna ports are used for all distributed EPDCCH messages in the PRB pair and provide two-fold antenna diversity (if the eNB chooses to transmit each port from a separate antenna, which is an implementation choice). For localized EPDCCH, there are up to four antenna ports 107-110, and each antenna port is used by one EPDCCH message only in that PRB pair.

Port 107 uses 12 REs out of the 24 REs in the PRB pair, while port 109 uses the other 12 REs. Hence, the DMRS REs belonging to ports 107 and 109 are time and frequency multiplexed in the PRB pair. On the other hand, ports 107 and 108 (and also ports 109 and 110) use the same REs but are code multiplexed by applying an Orthogonal Cover Code (OCC) on top of 4 REs on the same subcarrier. The OCC used for ports 107-110 to create orthogonality are shown in the table below from 3GPP TS 36.211.

TABLE 6.10.3A.2-1

| The sequence $\bar{w}_p^{(i)}$ for normal cyclic prefix | |
|---|---|
| Antenna port p | $[\bar{w}_p(0)\ \bar{w}_p(1)\ \bar{w}_p(2)\ \bar{w}_p(3)]$ |
| 107 | [+1 +1 +1 +1] |
| 108 | [+1 −1 +1 −1] |
| 109 | [+1 +1 +1 +1] |
| 110 | [+1 −1 +1 −1] |

For extended CP, only code multiplexed DMRS is used, and the length of two OCCs for ports 107 and 108 are given in the table below from 3GPP TS 36.211.

TABLE 6.10.3A.2-2

| The sequence $\bar{w}_p^{(i)}$ for extended cyclic prefix | |
|---|---|
| Antenna port p | $[\bar{w}_p(0)\ \bar{w}_p(1)]$ |
| 107 | [+1 +1] |
| 108 | [−1 +1] |

When receiving the distributed EPDCCH, the UE estimates the channel in each DMRS RE, and then the UE uses the OCC within each subcarrier and the corresponding three subcarriers within the PRB pair to obtain the channel estimate for antenna ports 107 and 109, respectively. These channel estimates are then used when demodulating the EPDCCH.

Demodulation of PDSCH

For PDSCH, the antenna port (port 7-15) to use for demodulation of DMRS based transmission modes (9 or 10) is included in the Downlink Control Information (DCI) message that schedules the PDSCH. The DMRS antenna ports 7-15 for PDSCH use the same REs in the PRB pair as the DMRS ports 107, 109 for EPDCCH. Hence, for a rank 1 transmission, which is what an MTC device will use, port 7 will be used for PDSCH demodulation, and the corresponding REs are shown in FIG. 8.

For PDSCH DMRS ports, the following OCCs are applied (the following table is a reproduction of Table 6.10.3.2-1 from 3GPP TS 36.211):

Table 6.10.3.2-1

| The sequence $\bar{w}_p^{(i)}$ for normal cyclic prefix | |
|---|---|
| Antenna port p | $[\bar{w}_p(0)\ \bar{w}_p(1)\ \bar{w}_p(2)\ \bar{w}_p(3)]$ |
| 7 | [+1 +1 +1 +1] |
| 8 | [+1 −1 +1 −1] |
| 9 | [+1 +1 +1 +1] |
| 10 | [+1 −1 +1 −1] |
| 11 | [+1 +1 −1 −1] |
| 12 | [−1 −1 +1 +1] |
| 13 | [+1 −1 −1 +1] |
| 14 | [−1 +1 +1 −1] |

SUMMARY

Systems and methods are disclosed herein that relate to transmitting and receiving a transmission when there is a collision between the transmission and reserved Resource Elements (REs). In some embodiments, a radio access node for a cellular communications network is disclosed, wherein the radio access node comprises a transceiver, a processor, and memory storing instructions executable by the processor whereby the radio access node is operable to transmit, via the transceiver, a downlink transmission to a wireless device using one or more Physical Resource Blocks (PRBs) that comprise reserved REs by puncturing the downlink transmission at positions of the reserved REs. In some embodiments, the downlink transmission is an Enhanced Physical Downlink Control Channel (EPDCCH) transmission or a Physical Downlink Shared Channel (PDSCH) transmission.

In some embodiments, the downlink transmission is an EPDCCH transmission. Further, in some embodiments, the reserved REs are REs utilized for one or more Channel State Information Reference Signals (CSI-RSs).

In some embodiments, the downlink transmission is a PDSCH transmission. Further, in some embodiments, the reserved REs are REs utilized for one or more CSI-RSs.

Embodiments of a method of operation of a radio access node in a cellular communications network are also disclosed. In some embodiments, the method of operation of the radio access node comprises transmitting a downlink transmission to a wireless device using one or more PRBs that comprise reserved REs by puncturing the downlink transmission at positions of the reserved REs. In some embodiments, the downlink transmission is an EPDCCH transmission or a PDSCH transmission.

In some embodiments, the downlink transmission is an EPDCCH transmission. Further, in some embodiments, the reserved REs are REs utilized for one or more CSI-RSs.

In some embodiments, the downlink transmission is a PDSCH transmission. Further, in some embodiments, the reserved REs are REs utilized for one or more CSI-RSs.

In some embodiments, a radio access node for a cellular communications network is adapted to perform the method of operation of a radio access node according to any of the embodiments disclosed herein.

In some embodiments, a radio access node for a cellular communications network comprises a transmit module operable to transmit a downlink transmission to a wireless device using one or more PRBs that comprise reserved REs by puncturing the downlink transmission at positions of the reserved REs. In some embodiments, the downlink transmission is an EPDCCH transmission or a PDSCH transmission.

Embodiments of a non-transitory computer-readable medium are disclosed, wherein the non-transitory computer-readable medium stores software instructions that when executed by one or more processors of a radio access node cause the radio access node to transmit a downlink transmission to a wireless device using one or more PRBs that comprise reserved REs by puncturing the downlink transmission at positions of the reserved REs. In some embodiments, the downlink transmission is an EPDCCH transmission or a PDSCH transmission.

Embodiments of a computer program are disclosed, wherein the computer program comprises instructions which, when executed on at least one processor, cause the at least one processor to carry out the method of operation of a radio access node according to any of the embodiments disclosed herein. Embodiments of a carrier are also disclosed, wherein the carrier contains the aforementioned computer program and is one of an electronic signal, an optical signal, a radio signal, or a computer readable storage medium.

Embodiments of a wireless device enabled to operate in a cellular communications network are also disclosed. In some embodiments, the wireless device comprises a transceiver, a processor, and memory storing instructions executable by the processor whereby the wireless device is operable to receive, via the transceiver, a downlink transmission from a radio access node on one or more PRBs based on an assumption by the wireless device that the downlink transmission on the one or more PRBs is punctured by reserved REs if any. In some embodiments, the downlink transmission is an EPDCCH transmission or a PDSCH transmission.

In some embodiments, the downlink transmission is an EPDCCH transmission. Further, in some embodiments, the reserved REs are REs utilized for one or more CSI-RSs.

In some embodiments, the downlink transmission is a PDSCH transmission. Further, in some embodiments, the reserved REs are REs utilized for one or more CSI-RSs.

Embodiments of a method of operation of a wireless device in a cellular communications network are also disclosed. In some embodiments, the method of operation of the wireless device comprises receiving a downlink transmission from a radio access node on one or more PRBs based on an assumption by the wireless device that the downlink transmission on the one or more PRBs is punctured by reserved REs if any. In some embodiments, the downlink transmission is an EPDCCH transmission or a PDSCH transmission.

In some embodiments, the downlink transmission is an EPDCCH transmission. Further, in some embodiments, the reserved REs are REs utilized for one or more CSI-RSs.

In some embodiments, the downlink transmission is a PDSCH transmission. Further, in some embodiments, the reserved REs are REs utilized for one or more CSI-RSs.

In some embodiments, a wireless device enabled to operate in a cellular communications network is adapted to perform the method of operation of a wireless device according to any of the embodiments disclosed herein.

In some embodiments, a wireless device enabled to operate in a cellular communications network comprises a receive module operable to receive a downlink transmission from a radio access node on one or more PRBs based on an assumption by the wireless device that the downlink transmission on the one or more PRBs are punctured by reserved REs if any. In some embodiments, the downlink transmission is an EPDCCH transmission or a PDSCH transmission.

Embodiments of a non-transitory computer-readable medium are also disclosed, wherein the non-transitory computer-readable medium stores software instructions that when executed by one or more processors of a wireless device cause the wireless device to receive a downlink transmission from a radio access node on one or more PRBs based on an assumption by the wireless device that the downlink transmission on the one or more PRBs are punctured by reserved REs if any. In some embodiments, the downlink transmission is an EPDCCH transmission or a PDSCH transmission.

Embodiments of a computer program are also disclosed, wherein the computer program comprises instructions which, when executed on at least one processor, cause the at least one processor to carry out the method of operation of a wireless device according to any of the embodiments disclosed herein. Further, embodiments of a carrier containing the aforementioned computer program are also disclosed, wherein the carrier is one of an electronic signal, an optical signal, a radio signal, or a computer readable storage medium.

In other embodiments, a method of operation of a wireless device in a cellular communications network comprises obtaining an indicator that is indicative of whether reserved REs are present in a subframe in which a downlink transmission is transmitted from a radio access node to the wireless device. The downlink transmission is an EPDCCH transmission or a PDSCH transmission. The method further comprises determining whether reserved REs are present in the subframe based on the indicator and, upon determining that reserved REs are present in the subframe, attempting reception of the downlink transmission based on an assumption that reserved REs are present in the subframe.

In some embodiments, the method further comprises, upon determining that reserved REs are not present in the subframe, attempting reception of the downlink transmission based on an assumption that reserved REs are not present in the subframe.

In some embodiments, the downlink transmission is an EPDCCH transmission. Further, in some embodiments, the reserved REs are REs utilized for one or more CSI-RSs.

In some embodiments, the downlink transmission is a PDSCH transmission. Further, in some embodiments, the reserved REs are REs utilized for one or more CSI-RSs.

In some embodiments, obtaining the indicator comprises detecting an Orthogonal Cover Code (OCC) indicator in the subframe that is indicative of whether reserved REs are present in the subframe. Further, in some embodiments, the OCC indicator is an OCC utilized for a Demodulation Reference Signal (DMRS) antenna port within the subframe. In some embodiments, the OCC indicator is further indicative of which of a plurality of predefined sets of reserved REs is present in the subframe. In some embodiments, positions of the reserved REs within the subframe are predefined.

In some embodiments, obtaining the indicator comprises receiving and storing a configuration of reserved REs in multiple subframes, including the subframe, from received system information. The configuration of reserved REs in the multiple subframes comprises the indicator that is indicative of whether reserved REs are present in the subframe. Further, in some embodiments, the wireless device is a Machine Type Communication (MTC) device, and the received system information is a MTC Master Information Block (MTC-MIB). In other embodiments, the wireless device is a MTC device, and the received system information is a MTC Secondary Information Block (MTC-SIB).

In some embodiments, attempting reception of the downlink transmission based on an assumption that reserved REs are present in the subframe comprises de-mapping a plurality of REs corresponding to the downlink transmission from one or more Physical Resource Blocks (PRBs) in the subframe.

In some embodiments, attempting reception of the downlink transmission based on an assumption that reserved REs are present in the subframe comprises ignoring the reserved REs during reception of the downlink transmission.

Embodiments of a wireless device enabled to operate in a cellular communications network are also disclosed. In some embodiments, the wireless device comprises a transceiver, a processor, and memory storing instructions executable by the processor whereby the wireless device is operable to: obtain an indicator that is indicative of whether reserved REs are present in a subframe in which a downlink transmission is transmitted from a radio access node to the wireless device; determine whether reserved REs are present in the subframe based on the indicator; and, upon determining that reserved REs are present in the subframe, attempt reception of the downlink transmission based on an assumption that reserved REs are present in the subframe. In some embodiments, the downlink transmission is an EPDCCH transmission or a PDSCH transmission.

In some embodiments, in order to obtain the indicator, the wireless device is further operable to detect an OCC indicator in the subframe that is indicative of whether reserved REs are present in the subframe.

In some embodiments, in order to obtain the indicator, the wireless device is further operable to receive and store a configuration of reserved REs in multiple subframes, including the subframe, from received system information. The configuration of reserved REs in the multiple subframes comprising the indicator that is indicative of whether reserved REs are present in the subframe.

In some embodiments, a wireless device enabled to operate in a cellular communications network is adapted to perform the method of operation of a wireless device according to any of the embodiments disclosed herein.

In some embodiments, a wireless device enabled to operate in a cellular communications network comprises an obtaining module operable to obtain an indicator that is indicative of whether reserved REs are present in a subframe in which a downlink transmission is transmitted from a radio access node to the wireless device, a determining module operable to determine whether reserved REs are present in the subframe based on the indicator, and a reception module operable to, upon determining that reserved REs are present in the subframe, attempt reception of the downlink transmission based on an assumption that reserved REs are present in the subframe. In some embodiments, the downlink transmission is an EPDCCH transmission or a PDSCH transmission.

Embodiments of a non-transitory computer-readable medium are also disclosed, wherein the non-transitory computer-readable medium stores software instructions that when executed by one or more processors of a wireless device cause the wireless device to: obtain an indicator that is indicative of whether reserved REs are present in a subframe in which a downlink transmission is transmitted from a radio access node to the wireless device in a subframe, determine whether reserved REs are present in the subframe based on the indicator, and upon determining that reserved REs are present in the subframe, attempt reception of the downlink transmission based on an assumption that reserved REs are present in the subframe. In some embodiments, the downlink transmission is an EPDCCH transmission or a PDSCH transmission.

Embodiments of a computer program are also disclosed, wherein the computer program comprises instructions which, when executed on at least one processor, cause the at least one processor to carry out the method of operation of a wireless device according to any of the embodiments disclosed herein. Further, embodiments of a carrier containing the aforementioned computer program are also disclosed, wherein the carrier is one of an electronic signal, an optical signal, a radio signal, or a computer readable storage medium.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
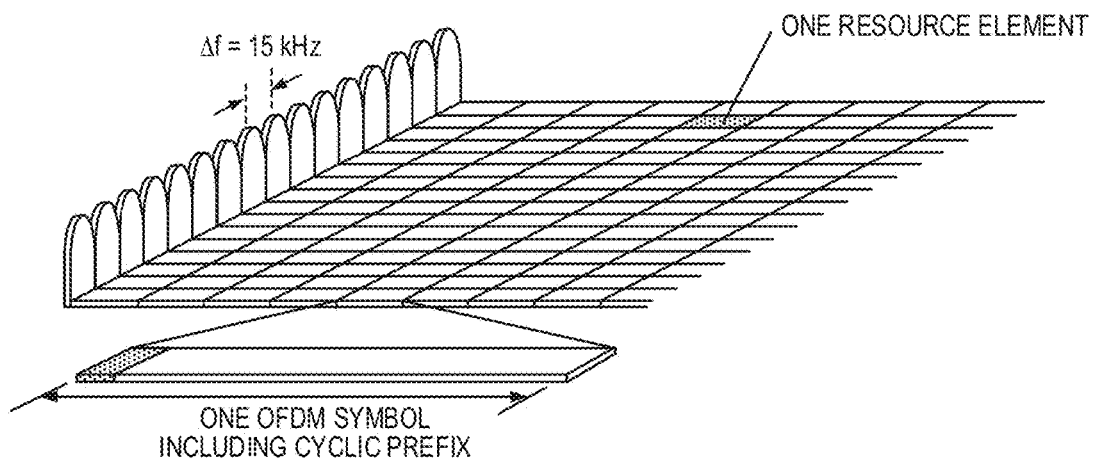
FIG. 1 is a schematic diagram showing Long Term Evolution (LTE) physical resources.
Figure 2:
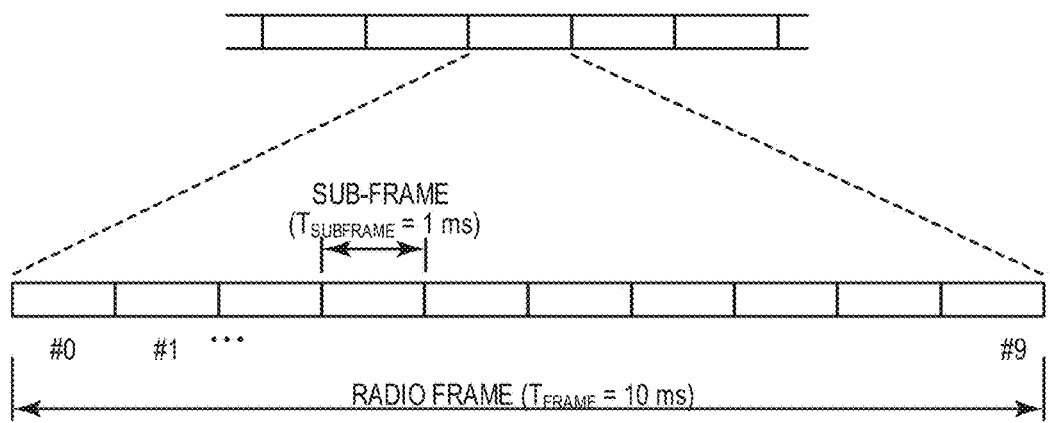
FIG. 2 is a schematic diagram of an LTE radio frame.
Figure 3:
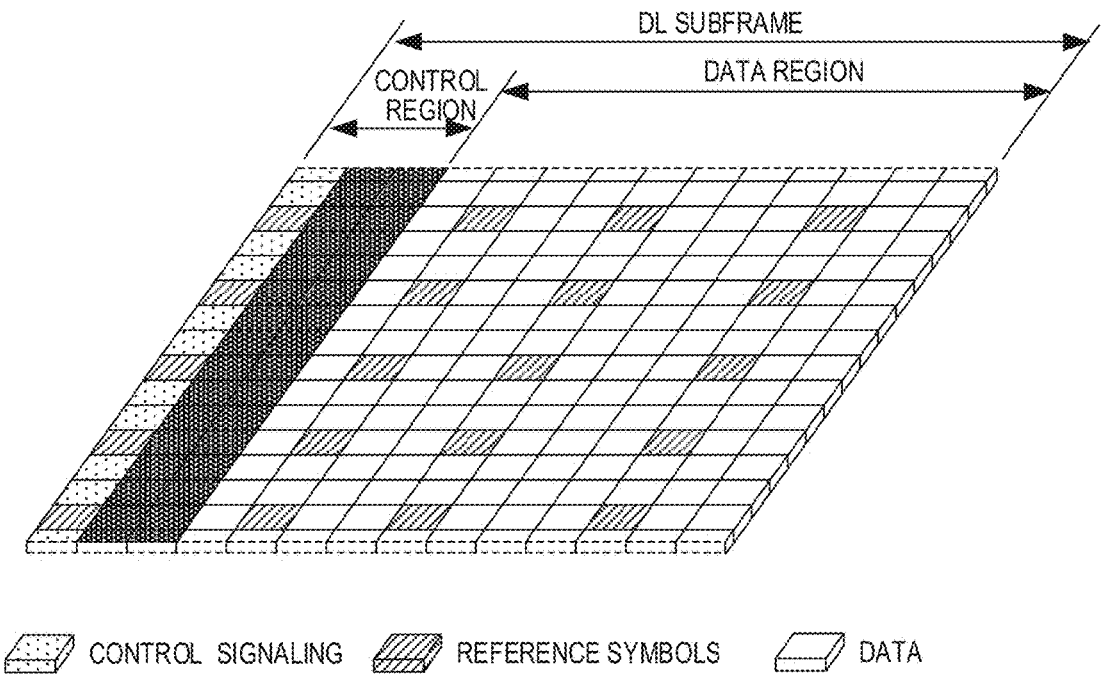
FIG. 3 is a schematic diagram of a downlink subframe.
Figure 4:
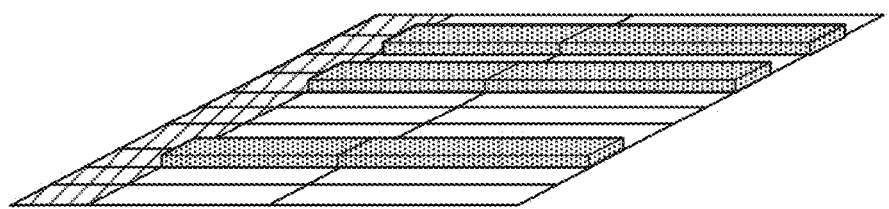
FIG. 4 is a schematic diagram of a downlink subframe showing ten Resource Block (RB) pairs and configuration of three enhanced Physical Downlink Control Channel (EPDCCH) regions of size 1 Physical RB (PRB) pair each.
Figure 5:
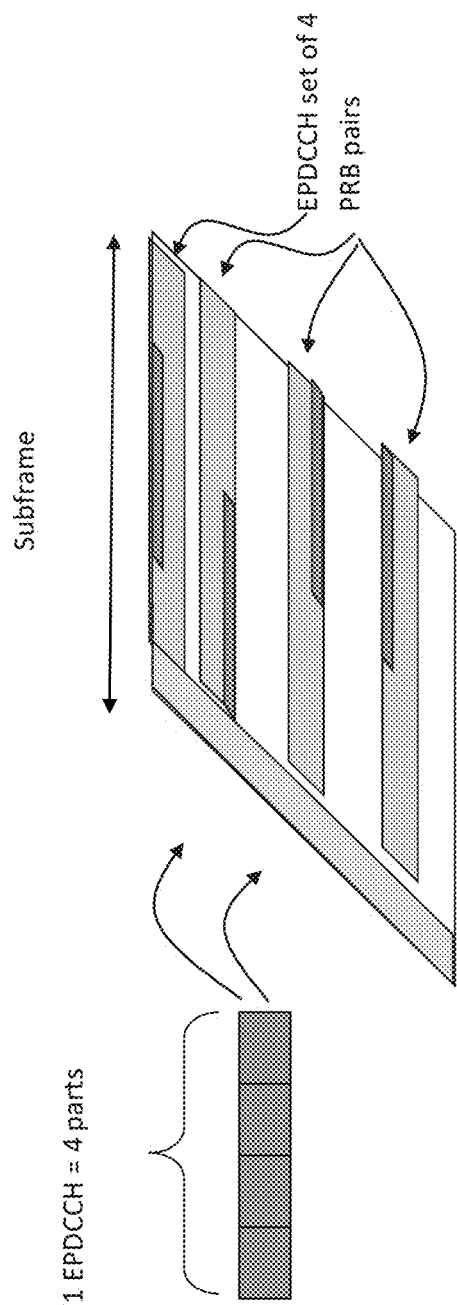
FIG. 5 is an illustration of the concept of distributed EPDCCH transmission.
Figure 6:
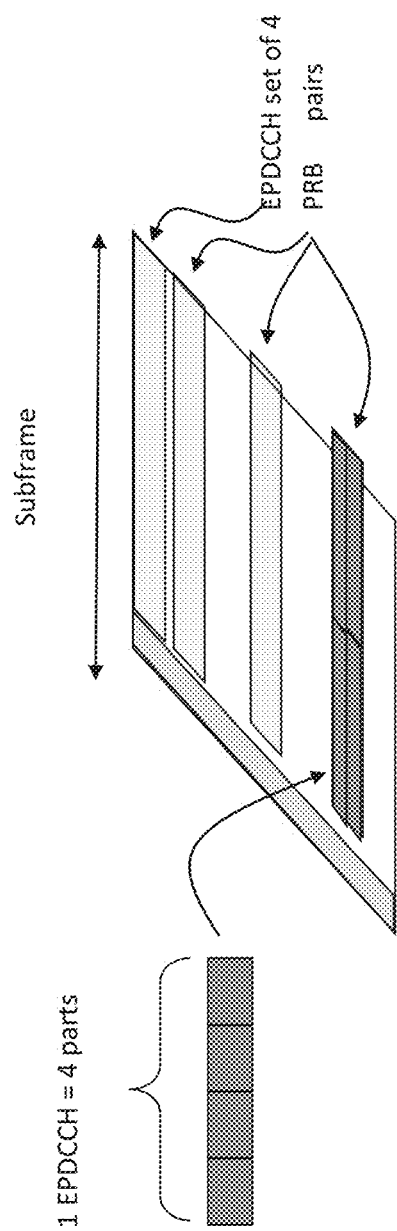
FIG. 6 is an illustration of localized EPDCCH transmission.
Figure 7:
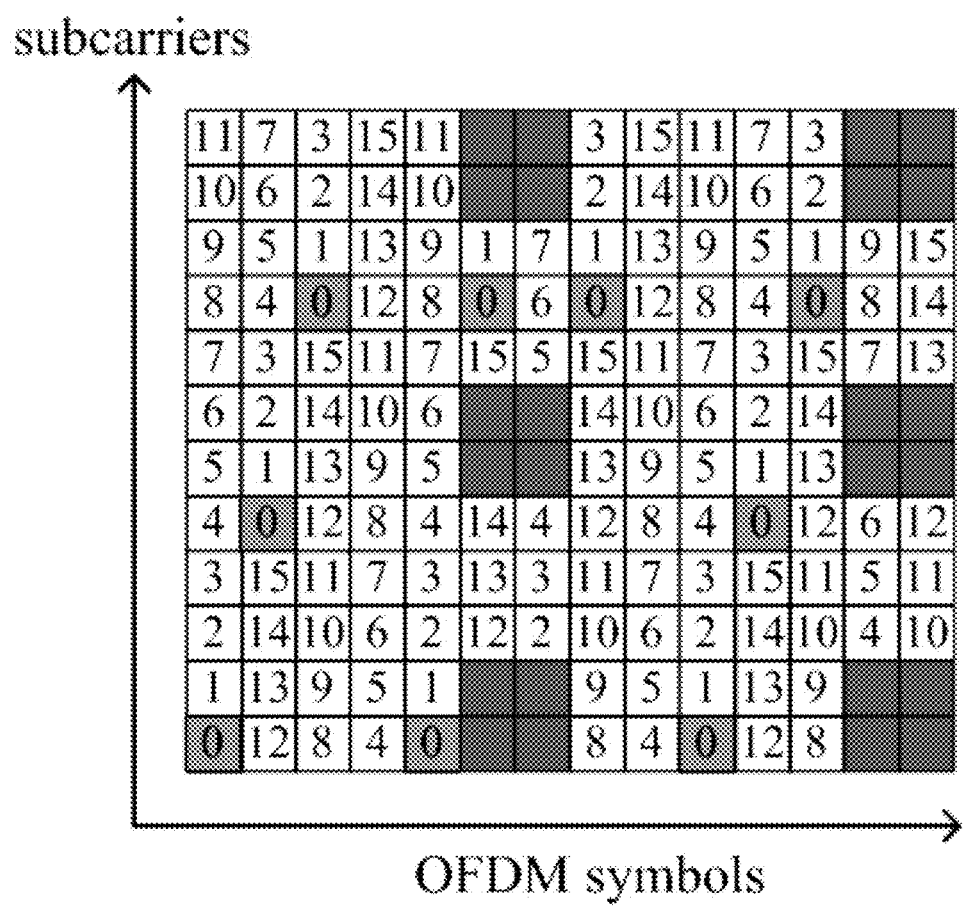
FIG. 7 illustrates the division of a PRB pair of normal Cyclic Prefix (CP) configuration in a normal subframe into enhanced Resource Element Groups (eREGs)
Figure 8:
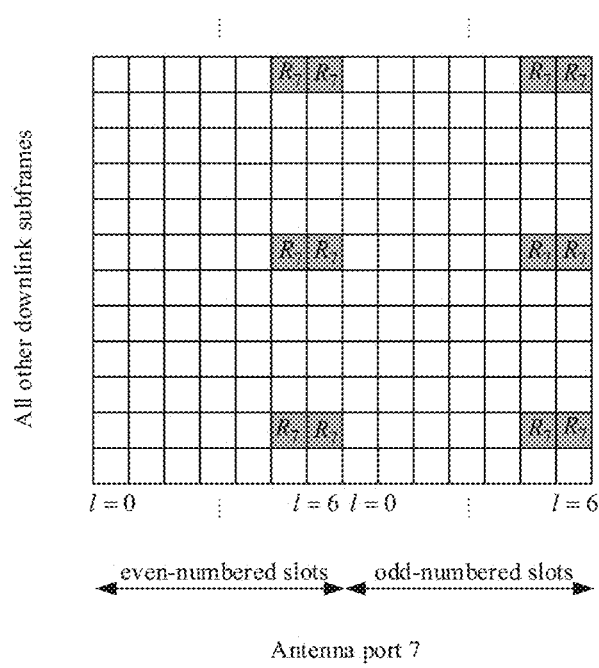
FIG. 8 illustrates the Resource Elements (REs) used for Physical Downlink Shared Channel (PDSCH) demodulation for a rank 1 transmission.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Radio Node: As used herein, a "radio node" is either a radio access node or a wireless device.

Radio Access Node: As used herein, a "radio access node" is any node in a radio access network of a cellular communications network that operates to wirelessly transmit and/or receive signals. Some examples of a radio access node include, but are not limited to, a base station (e.g., an enhanced or evolved Node B (eNB) in a Third Generation Partnership Project (3GPP) Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a Core Network (CN). Some examples of a CN node include, e.g., a Mobility Management Entity (MME), a Packet Data Network (PDN) Gateway (P-GW), a Service Capability Exposure Function (SCEF), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP LTE network and a Machine Type Communication (MTC) device.

Network Node: As used herein, a "network node" is any node that is either part of the radio access network or the CN of a cellular communications network/system.

Note that the description given herein focuses on a 3GPP cellular communications system and, as such, 3GPP LTE terminology or terminology similar to 3GPP LTE terminology is oftentimes used. However, the concepts disclosed herein are not limited to a 3GPP system.

Note that, in the description herein, reference may be made to the term "cell;" however, particularly with respect to Fifth Generation (5G) concepts, beams may be used instead of cells and, as such, it is important to note that the concepts described herein are equally applicable to both cells and beams.

In LTE, a physical control or data channel, such as a Physical Downlink Shared Channel (PDSCH) or Enhanced Physical Downlink Control Channel (EPDCCH), is mapped to Resource Elements (REs) for transmission. Some REs contains other signals such as Reference Signals (RS), and, in those cases, the data is not mapped to those REs. The presence and location of the RSs are, for some RS types such as Channel State Information Reference Signal (CSI-RS), signaled to each UE in a dedicated configuration message.

A problem then occurs when attempting to receive a physical control or data channel, such as an EPDCCH or a PDSCH containing a paging message, a system information message (e.g., a Secondary Information Block (SIB)), a Multimedia Broadcast/Multicast Service (MBMS) scheduling message, or a Random Access Response (RAR) message, before the locations, or positions, of these UE specific RSs, such as CSI-RSs, have been indicated to the UE. For instance, a UE should be able to receive RAR messages when accessing the cell without being configured with the location of the CSI-RS beforehand.

This problem is particularly severe when a PDSCH containing, e.g., RARs are repeated over many, sometimes tens or hundreds, of subframes, since some subframes contain UE specific RSs (configured to other UEs) and some subframes do not. This repeated PDSCH is typical for extended coverage operation of LTE, which is under discussion for LTE Release 13 (Rel-13).

One solution is to puncture the PDSCH with CSI-RS without the UE knowing about the puncturing. In other words, the UE does not know about the puncturing and, as such, assumes that there are no CSI-RSs within the PRBs on which the PDSCH is received. The UE may still be able to decode the PDSCH but with a loss in performance and coverage. In some cases, if CSI-RS puncturing is severe, the PDSCH message may be impossible to decode, which is a further problem.

Embodiments are also disclosed in which various means for providing information to the receiving UE to enable the UE to earlier detect whether the subframe contains reserved REs or not. As used herein, the term "reserved RE" refers to an RE that is occupied by, for instance, CSI-RS.

In some embodiments, the transmitter (i.e., the transmitter of the radio access node such as, e.g., the eNB) modifies the Demodulation Reference Signal (DMRS) of the antenna ports used for the demodulation of the message. For instance, an antenna port does not only correspond to one Orthogonal Cover Code (OCC) but to two OCCs. If the CSI-RS is not present in the subframe, then the first OCC is used; otherwise, the second OCC is used for this antenna port. The UE can then in the channel estimation process detect whether the first or second OCC was transmitted for this antenna port. Then, the UE knows whether CSI-RS (i.e., reserved REs) are present in the subframe or not and can de-map the message from the REs in the Physical Resource Block (PRB) pair in a correct way. Hence, in some embodiments, per-subframe, implicit indication of CSI-RS presence is provided at each UE in a UE-specific manner.

In some other embodiments, broadcast configuration information about reserved REs is broadcast to UEs. Hence, in some embodiments, a semi-static, explicit indication of CSI-RS is provided to multiple UEs (e.g., MTC UEs) in a shared manner.

Aspects of the embodiments of the present disclosure are directed to a method performed at a UE, where the UE comprises a transceiver and a hardware processor. In some embodiments, the UE can receive information about reserved REs. The UE can determine whether a subframe includes a reserved RE. The UE can attempt reception of a Physical Downlink Control Channel (PDCCH) on the subframe based on whether the subframe includes a reserved RE.

Advantages of the present disclosure are readily identifiable to those of ordinary skill in the art. Among the advantages are improvements in the reception performance of messages in situations where there may be ambiguity between an eNB and a UE of which REs are reserved for other signals such as CSI-RSs.

This disclosure addresses the problem of a UE, particularly a MTC UE, being able to receive a downlink transmission (e.g., EPDCCH or PDSCH transmission) when transmitting the downlink transmission from the eNB to the UE when the receiver (i.e., the UE) is not aware of the presence and location of reserved REs in the PRB pair. Of particular interest is when such a message is repeated over many subframes, since there will be a collision in some of these subframes only (as not all subframes contain reserved REs). When transmitting such a message in only a single subframe, the problem may be avoided by the scheduler at the eNB by simply avoiding subframes containing reserved REs of which the receiving UE is unaware. This approach, used in legacy systems, cannot be used when the message is repeated over many subframes.

Typical applications include transmitting paging, system information, random access response, and/or EPDCCH containing a common search space (which needs to be received prior to receiving system information in a PDSCH message, for instance). A common occurrence of a reserved RE is the transmission of CSI-RS, which is specifically configured by dedicated Radio Resource Control (RRC) signaling. Prior to receiving this configuration, the eNB has to transmit paging, RAR, etc. in subframes without CSI-RS, or the message needs to be punctured by CSI-RS leading to degraded performance.

Puncturing means that the PDSCH or the EPDCCH is first mapped to REs and then the RE reserved for, e.g., CSI-RS are replaced by the CSI-RS signals. Hence, the UE will "believe" that all REs are used for PDSCH but in fact some of them contain CSI-RS. As the UE is unaware of this, the UE will treat whatever is transmitted in these reserved REs as PDSCH REs and performance degrades.

If the UE is aware of the CSI-RS presence (or any other reserved RE), then the CSI-RS can be mapped to the RE first and then the PDSCH or EPDCCH is mapped to the RE around these CSI-RS REs. This is called rate matching around CSI-RS REs.

In some embodiments, the present disclosure provides systems and methods that avoid the losses associated with puncturing or rate matching. In some embodiments, whether or not a subframe contains reserved REs is dynamically (per subframe) indicated to the UE, prior to the demodulation. In some embodiments, the way to do this is to encode information in the DMRS used to demodulate the message. The UE can then test hypotheses of the DMRS and detect one of them to determine the presence or absence of reserved REs.

Figure 9:
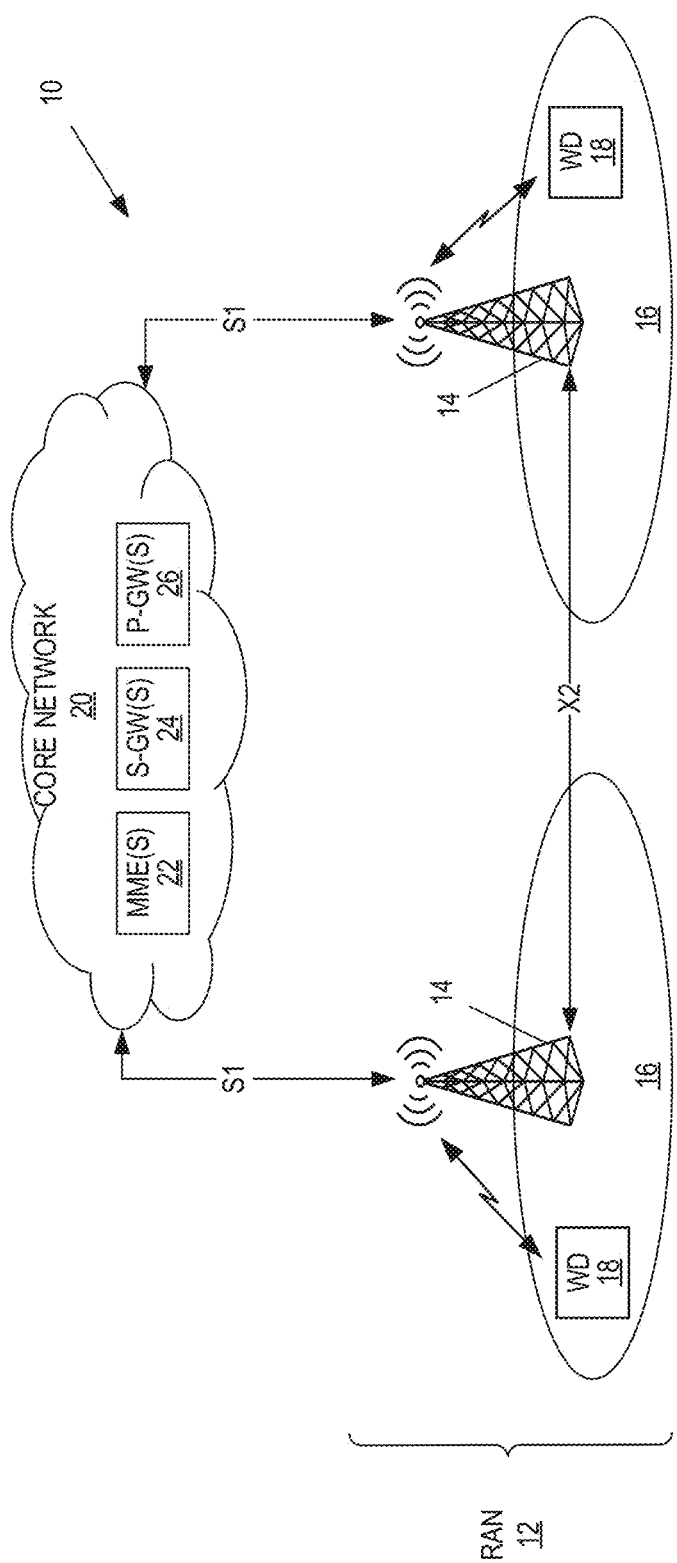
FIG. 9 illustrates one example of a cellular communications network in which embodiments of the present disclosure may be implemented.

In this regard, FIG. 9 illustrates one example of a cellular communications network 10 in which embodiments of the present disclosure may be implemented. In this example, the cellular communications network 10 is a 3GPP LTE network and, as such, LTE terminology is sometimes used; however, the concepts disclosed herein are not limited to LTE.

As illustrated, the cellular communication network 10 includes a Radio Access Network (RAN) 12 that includes radio access nodes such as base stations 14 (eNBs in LTE terminology) that serve corresponding cells 16. The base stations 14 provide radio access to wireless devices 18 (e.g., UEs, MTC UEs, etc.) within the coverage areas of the cells 16. The base stations 14 are communicatively coupled via a base-station-to-base-station interface (referred to as an X2 interface in LTE) and are also communicatively coupled to a core network 20 via respective core network interfaces (referred to as S1 interfaces in LTE). The core network 20 includes a number of core network nodes including, e.g., one or more MMEs 22, one or more Serving Gateways (S-GWs) 24, and one or more P-GWs 26.

As described above, a problem arises when the wireless device 18 is a MTC device or other device that is unable to receive the conventional PDCCH (e.g., due to only receiving a small portion of the total system bandwidth). In particular, when attempting to receive an EPDCCH or PDSCH transmission, the wireless device 18 may not be aware of whether the PRBs on which reception is being attempted include reserved REs such as, e.g., REs used to transmit CSI-RS. If rate-matching is used at the base station 14 when transmitting the EPDCCH or PDSCH transmission, then the wireless device 18 will not be able to accurately de-map the REs used for the EPDCCH transmission or PDSCH transmission when reserved REs are present in the PRBs because the wireless device 18 is unaware of the reserved REs.

Figure 10:
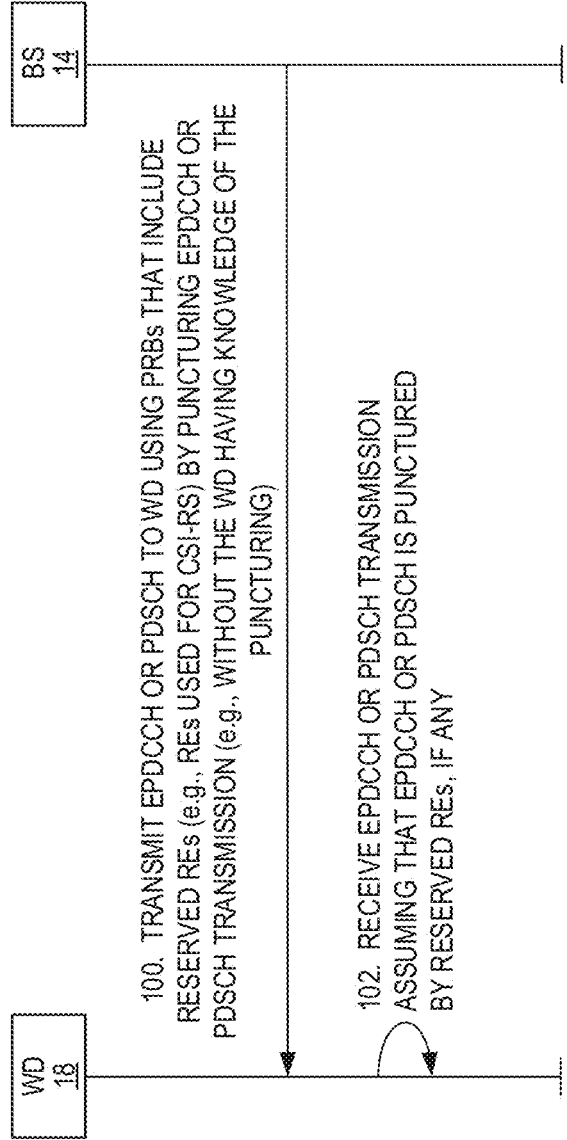
FIG. 10 illustrates the operation of a base station and a wireless device to enable reception of an EPDCCH transmission or a PDSCH transmission by the wireless device according to some embodiments of the present disclosure.

FIG. 10 illustrates the operation of the base station 14 and the wireless device 18 to enable reception of an EPDCCH transmission or a PDSCH transmission by the wireless device 18 according to some embodiments of the present disclosure. In some embodiments, the wireless device 18 is unaware of (i.e., does not have knowledge of) the configuration of reserved REs (e.g., REs used for CSI-RS) in the respective REs within the subframe. As illustrated, the base station 14 transmits an EPDCCH transmission or a PDSCH transmission (or potentially both) to the wireless device 18 using PRBs that include reserved REs (e.g., REs used for CSI-RS) by puncturing the EPDCCH transmission or the PDSCH transmission (e.g., without the wireless device 18 having knowledge of the puncturing) (step 100). Thus, when transmitting the downlink transmission (i.e., the EPDCCH transmission or the PDSCH transmission), the base station 14 first maps the REs for the downlink transmission to the PRBs and then maps, or overwrites, the reserved REs with the appropriate symbols (e.g., CSI-RS symbols). In some embodiments, at this point, the wireless device 18 is unaware of the puncturing.

The wireless device 18 receives (i.e., attempts to receive) the EPDCCH transmission or the PDSCH transmission in the subframe assuming that the EPDCCH transmission or the PDSCH transmission is punctured by reserved REs, if any (step 102). In other words, the wireless device 18 does not have knowledge of the presence of the reserved REs within the PRBs on which the wireless device 18 is attempting to receive the EPDCCH transmission or the PDSCH transmission and, as such, the wireless device 18 attempts to receive the EPDCCH transmission or the PDSCH transmission assuming that, if any reserved REs are present, the EPDCCH transmission or the PDSCH transmission is punctured by the reserved REs. In other words, this can be thought of as the wireless device 18 attempting to receive the EPDCCH transmission or the PDSCH transmission assuming that (as if) no reserved REs are present. The presence of the unknown reserved REs may degrade the ability of the wireless device 18 to successfully receive the EPDCCH transmission or the PDSCH transmission; however, this may be overcome at the base station 14 by, for example, increasing the number of repetitions (in the case of a MTC device where the EPDCCH transmission or the PDSCH transmission is repeated many times to provide enhanced coverage) Alternatively, the network can also reduce the code rate and thus improve the chance to decode the message at the receiver by increasing the number of aggregated eCCEs for the message (i.e., increasing the aggregation level) in case the network anticipates that the message will be punctured by REs unknown to the receiver.

In the embodiment of FIG. 10, the wireless device 18 may not be aware of the presence of the reserved REs. Embodiments are also disclosed herein for signaling the presence of reserved REs to the wireless device 18. In some embodiments, signaling is provided in the presence of reserved REs. More specifically, in some embodiments, for distributed EPDCCH, the normal OCC is used for ports 107 and 109 when there are no reserved REs (e.g., CSI-RS REs) in the subframe and, alternatively, a modified OCC is used when there are reserved REs present in the subframe. An example is provided in the table below. It should be noted that, in this example, it can equivalently be interpreted as ports 108/110 are used instead of ports 107/109 when there are reserved REs present in the subframe since the modified OCC matches these alternative antenna ports.

TABLE 1

OCC indicates presence of reserved RE in the subframe for distributed EPDCCH

| | Antenna port p | |
|---|---|---|
| | $[\overline{w}_p(0) \ \overline{w}_p(1) \ \overline{w}_p(2) \ \overline{w}_p(3)]$ | $[\overline{w}_p(0) \ \overline{w}_p(1) \ \overline{w}_p(2) \ \overline{w}_p(3)]$ |
| | Reserved RE present in subframe? | |
| | No | Yes |
| 107 | [+1 +1 +1 +1] | [+1 −1 +1 −1] |
| 109 | [+1 +1 +1 +1] | [+1 −1 +1 −1] |

Note that other OCCs than given by this example are also possible. It is also possible that multiple OCCs are used to indicate a different number of different sets of reserved REs such that it is possible to signal that, e.g., a few reserved REs are present in this subframe or that all REs that can potentially be reserved are actually reserved in this subframe.

In some further embodiments, the REs that belong to the set of reserved REs are given by specifications. For instance, in some embodiments, when detecting that a subframe has CSI-RS present, the wireless device 18 assumes that all possible CSI-RS resources (40 REs) are reserved. Alternatively, in some embodiments, the wireless device 18 is configured (e.g., at some time prior to receiving the OCC indicator) with the interpretation of "reserved RE" by receiving a system information broadcast message, or by reading information in the Subscriber Identification Module (SIM). In this case, it is possible that only a subset of the potential 40 REs for CSI-RS are treated as reserved REs, thus providing more accurate information than always assuming the maximum number of reserved REs.

For extended Cyclic Prefix (CP) and normal subframes, the OCC length, which currently is two, can be increased to four and the same method as for normal CP can be used.

In some other embodiments, OCCs can be applied for PDSCH and rank 1 transmission, as is used for low complexity MTC and coverage extension applications. For example, only port 7 is used for the PDSCH. In this case, the normal OCC for port 7 is [+1 +1 +1 +1]. Hence, the presence of reserved REs can be indicated by modifying the OCC for port 7 to [+1 −1 +1 −1] or any OCC that is orthogonal to the normal OCC for this port. Also, in this case, it is possible to indicate one out of multiple sets of reserved REs since there are 4 orthogonal OCCs of length 4 and each can be associated with a unique set of reserved REs. Identifying reserved REs is desirable for those messages that are sent before RRC configuration is received by the wireless device 18. These messages include SIB, RAR, and paging.

The OCC-based method has the benefit of no signaling overhead and dynamic subframe-by-subframe indication. One variation is to combine an OCC-based indication with the broadcast-based indication. For example, the broadcast-based indication provides a reserved RE pattern, while the OCC-based method indicates if the reserved RE is present or not in the current subframe.

In some further embodiments for localized EPDCCH, one of these antenna ports may, according to 3GPP Technical Specification (TS) 36.211 V11.6.0 and 3GPP TS 36.213 V11.11.0, be used for demodulation of an EPDCCH message in the PRB pair. Which antenna port to use depends on which enhanced Control Channel Element (eCCE) is used for the EPDCCH message. The table below shows one example how the OCC can be extended also in this case.

TABLE 2

OCC indicates presence of reserved RE in
the subframe for localized EPDCCH

| | Antenna port $p$ | |
|---|---|---|
| | $[\overline{w}_p(0)\ \overline{w}_p(1)$ $\overline{w}_p(2)\ \overline{w}_p(3)]$ | $[\overline{w}_p(0)\ \overline{w}_p(1)$ $\overline{w}_p(2)\ \overline{w}_p(3)]$ |
| | Reserved RE present | |
| | No | Yes |
| 107 | [+1 +1 +1 +1] | [+1 +1 −1 −1] |
| 108 | [+1 −1 +1 −1] | [+1 −1 −1 +1] |
| 109 | [+1 +1 +1 +1] | [+1 +1 −1 −1] |
| 110 | [+1 −1 +1 −1] | [+1 −1 −1 +1] |

Figure 11:
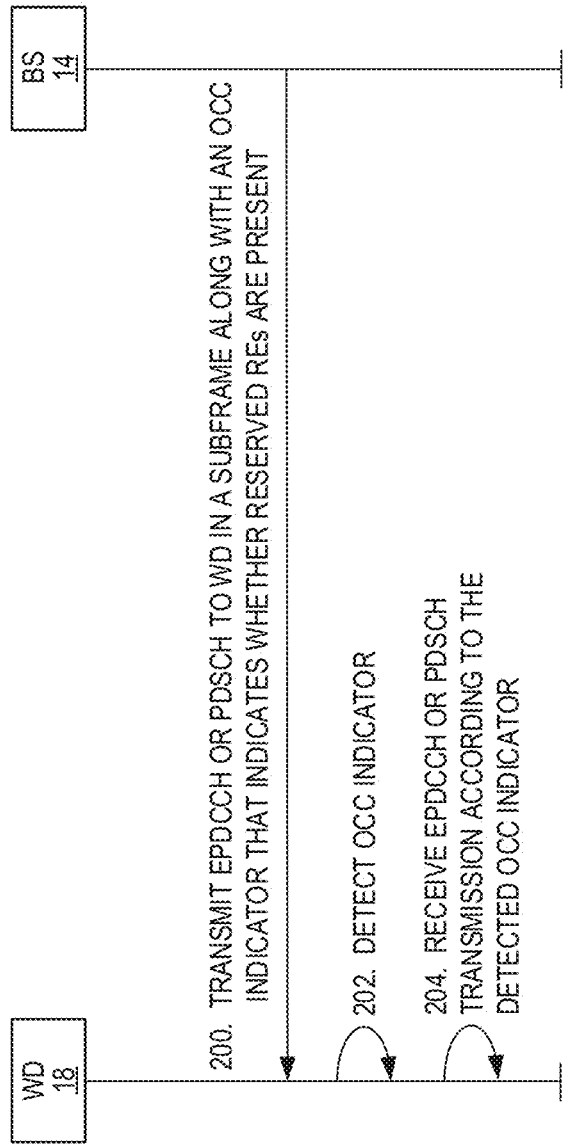
FIG. 11 illustrates the operation of the base station and the wireless device according to some embodiments in which the base station transmits a downlink transmission (e.g., an EPDCCH transmission or a PDSCH transmission) to the wireless device along with an Orthogonal Cover Code (OCC) indicator that indicates whether reserved REs are present according to some embodiments of the present disclosure.

In this regard, FIG. 11 illustrates the operation of the base station 14 and the wireless device 18 according to some embodiments in which the base station 14 transmits a downlink transmission (e.g., an EPDCCH transmission or a PDSCH transmission) to the wireless device 18 along with an OCC indicator that indicates whether reserved REs are present, as described above. As illustrated, the base station 14 transmits an EPDCCH or PDSCH transmission to the wireless device 18 in a subframe along with an OCC indicator that indicates whether reserved REs are present (step 200). In particular, in some embodiments, the OCC indicator indicates whether reserved REs are present in the subframe in which the EPDCCH or PDSCH transmission is transmitted. As discussed above, in some embodiments, the OCC indicator indicates only whether the reserved REs are present. In other embodiments, the OCC indicator also indicates the locations, or positions, of the reserved REs (e.g., indicates which of multiple predefined sets of reserved REs are present). In some embodiments, the OCC indicator is the OCC used for DMRS transmitted in the PRB(s) on which the EPDCCH or PDSCH transmission is transmitted. In some other embodiments, the OCC indicator is the OCC used for port 7 for the PDSCH transmission. Note, however, that the OCC indicator may be transmitted according to any of the embodiments described above.

The wireless device 18 detects the OCC indicator (step 202). For example, if the OCC indicator is the OCC used for the DMRS transmitted within the PRB(s) used for the EPDCCH transmission, then the wireless device 18 detects the OCC used for the DMRS. Based on the OCC indicator, the wireless device 18 determines whether reserved REs are present. The wireless device 18 then receives (i.e., attempts to receive) the EPDCCH or PDSCH transmission according to the detected OCC indicator (step 204). For example, if reserved REs are present and the base station 14 performs rate-matching of the downlink transmission around the reserved REs, then the wireless device 18 de-maps REs used for the downlink transmission from the received PRB(s) and avoids demapping symbols from reserved REs. As another example, if reserved REs are present and the base station 14 punctures the downlink transmission at the positions of the reserved REs, then the wireless device 18 ignores the reserved REs during decoding of the downlink transmission as the reserved REs will not include useful information for decoding the downlink transmission. Notably, the process of FIG. 11 is dynamic in that the OCC indicator is provided in the respective subframes such that the wireless device 18 is enabled to dynamically detect the presence of reserved REs within subframes via the respective OCC indicator.

Figure 12:
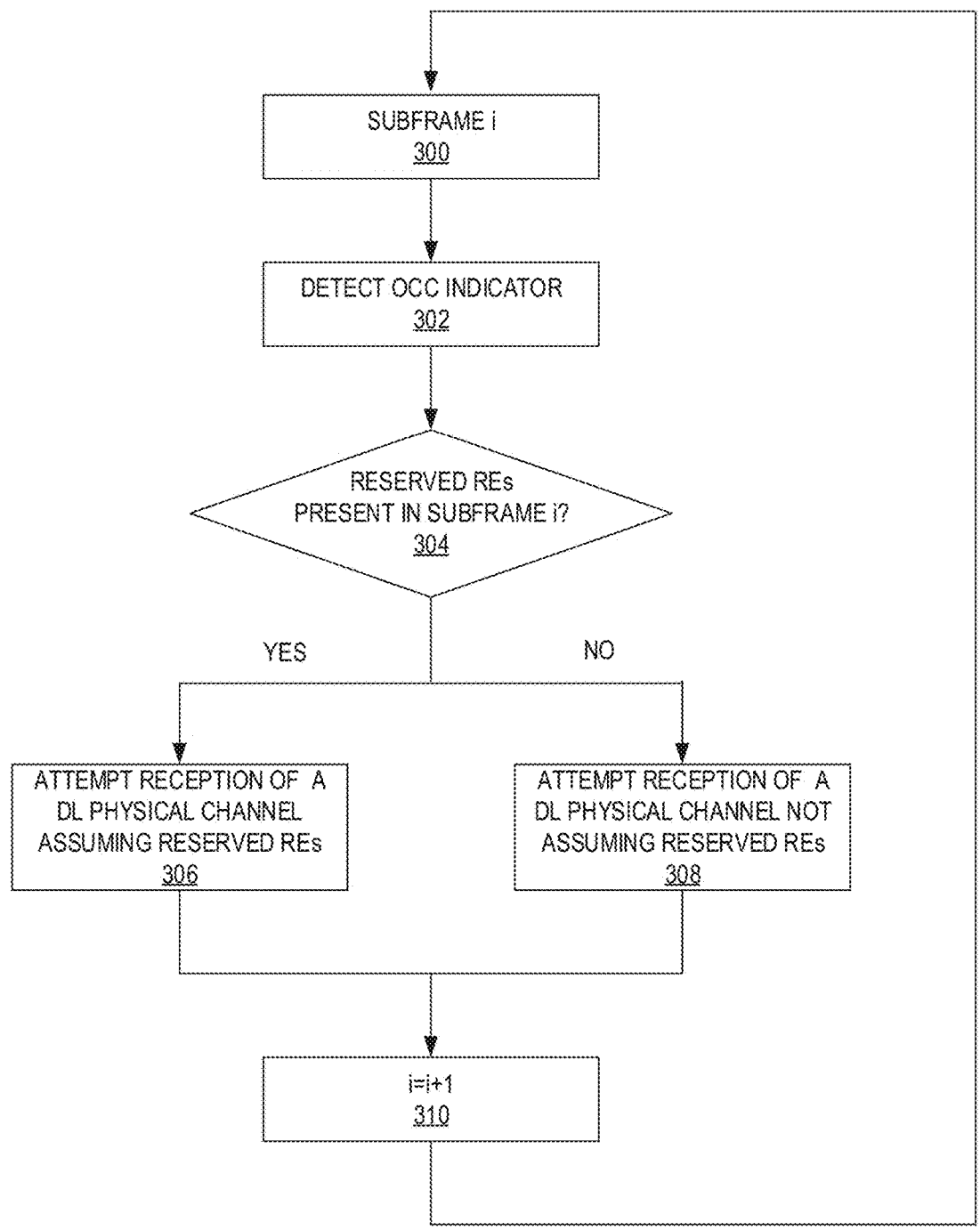
FIG. 12 is flow chart that illustrates the operation of the wireless device with respect to receiving and using an OCC indicator (also referred to herein as an OCC-based indication) according to some embodiments of the present disclosure.

FIG. 12 is flow chart that illustrates the operation of the wireless device 18 with respect to receiving and using an OCC indicator (also referred to herein as an OCC-based indication) according to some embodiments of the present disclosure. As illustrated, the process begins with subframe i (step 300). The wireless device 18 detects the OCC indicator in subframe i (step 302). Based on the detected OCC indicator, the wireless device 18 determines whether reserved REs are present in subframe i (step 304). In particular, the wireless device 18 detects the OCC indicator within PRB(s) in which the wireless device 18 is to attempt downlink reception (of an EPDCCH or PDSCH transmission) and, based on the detected OCC indicator, determines whether reserved REs are present in those PRB(s). If reserved REs are present, the wireless device 18 attempts reception of a downlink physical channel (i.e., a downlink transmission) (e.g., an EPDCCH or PDSCH) assuming reserved REs are present (step 306). Otherwise, if the OCC indicator detection indicates that reserved REs are not present, the wireless device 18 attempts reception of the downlink physical channel assuming that reserved REs are not present (step 308). The subframe index i is then incremented (step 310), and the process returns to step 300 and is repeated for the next subframe. In this manner, the OCC-based indication scheme is dynamic.

The new signaling described herein may be utilized in various manners. In some embodiments, the new signaling is utilized in a network, particularly for MTC or coverage extension applications. Both wireless device 18 (e.g., UE) and base station 14 (e.g., eNB) implementations are considered. For the following discussion, the base station 14 is specifically an eNB, and the wireless device 18 is specifically a UE; however, the following embodiments are not limited thereto.

In some embodiments, the eNB rate matches the transmitted message around the reserved RE. So, by detecting the indication correctly in the receiving UE, the UE can de-map the message from the correct set of REs. This has the advantage that "aware UEs" that have already managed to receive the dedicated RRC configuration of reserved REs (e.g., CSI-RS configuration) can receive the same PDSCH/EPDCCH message as those "unaware UEs" that have not received this RRC configuration yet. This is useful for broadcast messages such as system information, or messages for which the receiver is temporarily unknown to the transmitter, such as the RAR. Hence, the message is in the transmission mapped to the same set of REs in the subframe, avoiding the reserved REs, irrespective of whether the receiving UE is aware of the reserved REs or not. The "aware UE" can then directly use the alternative OCC when performing channel estimation in subframes where it knows there are CSI-RSs present. Hence, there is no need for the aware UE to perform the OCC detection.

In some other embodiments, the eNB punctures the message by CSI-RS. The UE may then, by detection using DMRS according to embodiments of the disclosure, understand that there is no useful information (no message) in these reserved RSs as they contain other information such as CSI-RS for other UEs, and can thus ignore these REs. This will improve the reception performance since garbage samples are not introduced into the decoder. The UE may in this case set the soft bit information of the message corresponding to these reserved REs to zero. An aware UE also needs to avoid the samples from these reserved REs, but the aware UE need not perform the detection step as it can directly use the correct DMRS/OCC.

A benefit of this puncturing embodiment, as opposed to the rate matching embodiment, is increased robustness, since if the detection fails in the UE, the message may still be decoded since the UE always assumes the correct number of encoded bits. In this case, the correct number of encoded bits is the same irrespective of whether the reserved REs are present or not in the subframe. If the receiver does not know the total number of encoded bits, the message is usually impossible to decode.

In some further embodiments, the detection is performed in multiple subframes in a repetition window, used for coverage enhancements in LTE. Hence, the UE may detect reserved REs in some subframes and "clean" subframes as well within one PDSCH/EPDCCH repetition window. If the puncturing approach is used, then the UE may use energy aggregation for a given RE across the subframes. In an aggregation bundle that carries a downlink transmission (either control or data), the UE then should ignore reserved REs from subframes where an indication of reserved REs has been detected.

Regarding the impact to EPDCCH construction, for eCCE mapping to construct EPDCCH, the presence or absence of CSI-RS is taken into account in the legacy system, since the UE-specific RRC signal carrying CSI-RS configuration has been received. Moreover, rate matching is always applied in constructing the EPDCCH. For an MTC UE, EPDCCH may be sent prior to receiving UE-specific RRC signaling. This includes, for example, EPDCCH common search space, EPDCCHs that are used to schedule PDSCH carrying MTC-SIB, paging, or random access responses. Compared to legacy EPDCCH, EPDCCHs that are receivable prior to the UE-specific RRC signal are different in terms of their construction.

Puncturing vs rate matching: EPDCCHs prior to a UE-specific RRC signal may need to use puncturing so that the EPDCCH is receivable even if the CSI-RS configuration information is not detected or detected incorrectly.

Imprecise CSI-RS configuration information: For EPDCCHs prior to a UE-specific RRC signal, the UE may only have imprecise CSI-RS configuration information, even if such configuration has been provided. Hence the eNB needs to take this into account in EPDCCH transmission, for example, by providing a higher aggregation level or more repetition across subframes.

In the embodiments of FIGS. 11 and 12, the presence of reserved REs was signaled via an OCC indicator. However, in other embodiments, the presence of reserved REs is signaled via broadcast signaling. More specifically, for SIB, RAR, paging, and EPDCCH common search space, the system information broadcast message may broadcast the CSI-RS occupation information (reserved RE) so that the common messages may be received while taking into account the presence of CSI-RS. This is also applicable to an EPDCCH UE-specific search space, before the RRC configuration of CSI-RS is received.

Since MTC-SIB2 (and several other MTC-SIBs) needs to be receivable by MTC UEs in RRC_IDLE, the MTC-SIBs have to be receivable by UEs that do not have RRC connection yet, in a state where the CSI-RS configuration is unknown. Thus, the CSI-RS configuration has to be broadcast so that UEs in RRC_IDLE state can also receive the information.

Note that the downlink messages designated to MTC UE reception, e.g., MTC-SIB, RAR, paging, are different from those not designated to MTC UE reception. For the generic SIB/RAR/paging, they need to be receivable by all legacy UEs. However, for those designed for MTC UEs, they only need to be receivable by Rel-13 (and later) UEs. Thus, backwards compatibility is no longer a requirement. Thus, the presence of reserved REs can be signaled and taken into account.

Regardless of which broadcast signal is used to carry the CSI-RS configuration, all downlink transmissions after the broadcast signal can utilize the CSI-RS configuration, but those before it are not able to utilize the CSI-RS configuration. For all of the downlink transmission(s) before the given broadcast signal, the UE assumes that CSI-RS are not present. For example, if MTC-SIB2 is designated to carry the CSI-RS configuration, then for receiving MTC-SIB1 and MTC-SIB2, the UE assumes that CSI-RS is not present. But the UE can account for the CSI-RS in receiving MTC-SIB3/4/ . . . , RAR, paging, and EPDCCH.

In some embodiments, CSI-RS configuration is carried in (i.e., included in) MTC-SIB1. Scheduling of MTC-SIB2/3/ . . . is via MTC-SIB1 or EPDCCH. In this case, MTC-SIB1 can provide a rough level of CSI-RS configuration. For example, subframe configuration of CSI-RS can be provided while within a subframe containing CSI-RS, and it is assumed that the maximum of 40 REs are reserved. The eNB punctures REs taken by CSI-RS when transmitting MTC-SIB1. When transmitting MTC-SIB2/3/ . . . , the eNB can take into account the CSI-RS configuration provided by MTC-SIB1. Using puncturing as an example, when receiving MTC-SIB2/3/ . . . (and its associated EPDCCH, if defined), the UE receiver knows to puncture the CSI-RS REs notified by the MTC-SIB1 in the decoding process. A similar process applies if rate matching is used instead of puncturing.

In contrast, if the MTC-SIB1 does not provide CSI-RS configuration and the eNB simply punctures REs taken by CSI-RS, the UE receiver does not know to puncture any CSI-RS REs when receiving MTC-SIB2/3/ . . . . The UE assumes that CSI-RS are not present in the subframe when receiving MTC-SIB2/3/ . . . . This degrades the UE reception quality. Thus, the eNB needs to use a lower Modulation and Coding Scheme (MCS) to compensate.

Since MTC-SIB1 is sent more frequently than MTC-SIB2/3/ . . . , the amount of information sent in MTC-SIB1 is limited. Thus, only fairly rough CSI-RS configuration information can be carried by MTC-SIB1, for example only time domain information in terms of subframe index, but not the pattern of reserved REs within a subframe.

In some other embodiments, CSI-RS configuration is carried in a MTC-SIB later than MTC-SIB1. In this case, later MTC-SIB (e.g., MTC-SIB2) can provide a more detailed level of CSI-RS configuration. For example, the more detailed level of CSI-RS configuration may include not only time domain information in terms of subframe indices, but also the pattern of reserved REs within a subframe. The later MTC-SIB is allowed to carry more bits since later MTC-SIBs are sent less frequently than MTC-SIB, thus incurring relatively lower overhead.

Using puncturing as an example, in some embodiments, the eNB punctures REs taken by CSI-RS. When receiving various types of downlink messages, the UE receiver knows to puncture the CSI-RS REs notified by the MTC-SIB2 in the decoding process. The downlink message types include: MTC-SIB3/ . . . , RAR, paging, and the EPDCCH before receiving CSI-RS configuration via RRC signaling. A similar technique applies if rate matching is used instead of puncturing.

Compared to using MTC-SIB1, using MTC-SIB2 (for example) to carry the CSI-RS configuration information means that PDSCH carrying MTC-SIB2 itself cannot utilize the CSI-RS information. Hence, PDSCH carrying MTC- SIB2 may need to be transmitted with stronger robustness, for example, by assigning lower modulation and coding rate and/or assigning more repetitions in time.

Figure 13:
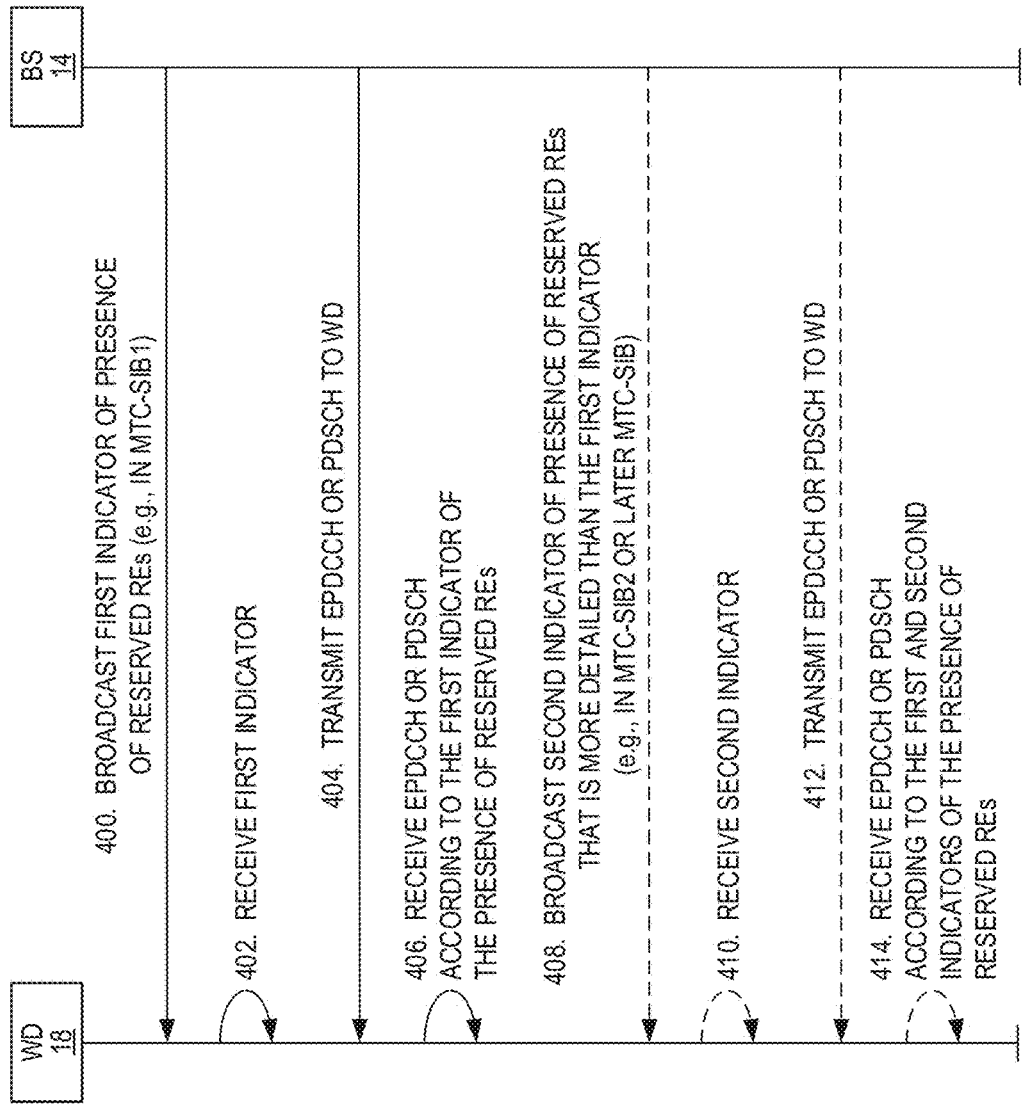
FIG. 13 illustrates the operation of the base station and the wireless device to provide and utilize broadcast signaling for indicating the presence of reserved REs according to some embodiments of the present disclosure.

FIG. 13 illustrates the operation of the base station 14 and the wireless device 18 to provide and utilize broadcast signaling for indicating the presence of reserved REs according to some embodiments of the present disclosure. As described above, the base station 14 (e.g., eNB) broadcasts a (first) indicator of the presence of reserved REs (step 400). This broadcast indicator includes, in some embodiments, time domain information regarding the presence of reserved REs (e.g., information that indicates which subframes include reserved REs). In addition, the broadcast indicator may further include more detailed information about the reserved REs (e.g., information that indicates which REs are reserved REs within the subframes that include reserved REs). As discussed above, in some embodiments, the broadcast indicator is included in a Master Information Block (MIB) (e.g., a MTC MIB) or a SIB (e.g., a MTC SIB such as, e.g., MTC-SIB2).

The wireless device 18 receives the broadcast indicator (step 402). At some point, the base station 14 transmits a downlink transmission (i.e., a downlink physical channel such as EPDCCH or PDSCH) to the wireless device 18 (step 404). The wireless device 18 receives (or attempts to receive) the downlink transmission according to the received broadcast indicator, as described above (step 406).

In some embodiments, the first indicator may be basic information (e.g., time domain information) regarding reserved REs provided via a MIB (e.g., MTC MIB), and a second indicator may subsequently be received that includes more detailed information regarding the reserved REs (e.g., information that indicates which REs within a subframe(s) are reserved REs). In this regard, in some embodiments (i.e., optionally), the base station 14 further broadcasts a second indicator of the presence of reserved REs that is more detailed than the first indicator (step 408). The second indicator may be included in a SIB (e.g., MTC-SIB2 or later). The wireless device 18 receives the second indicator (step 410). At some point, the base station 14 transmits a downlink transmission (i.e., a downlink physical channel such as EPDCCH or PDSCH) to the wireless device 18 (step 412). The wireless device 18 receives (or attempts to receive) the downlink transmission according to the first and second indicators, as described above (step 414).

Figure 14:
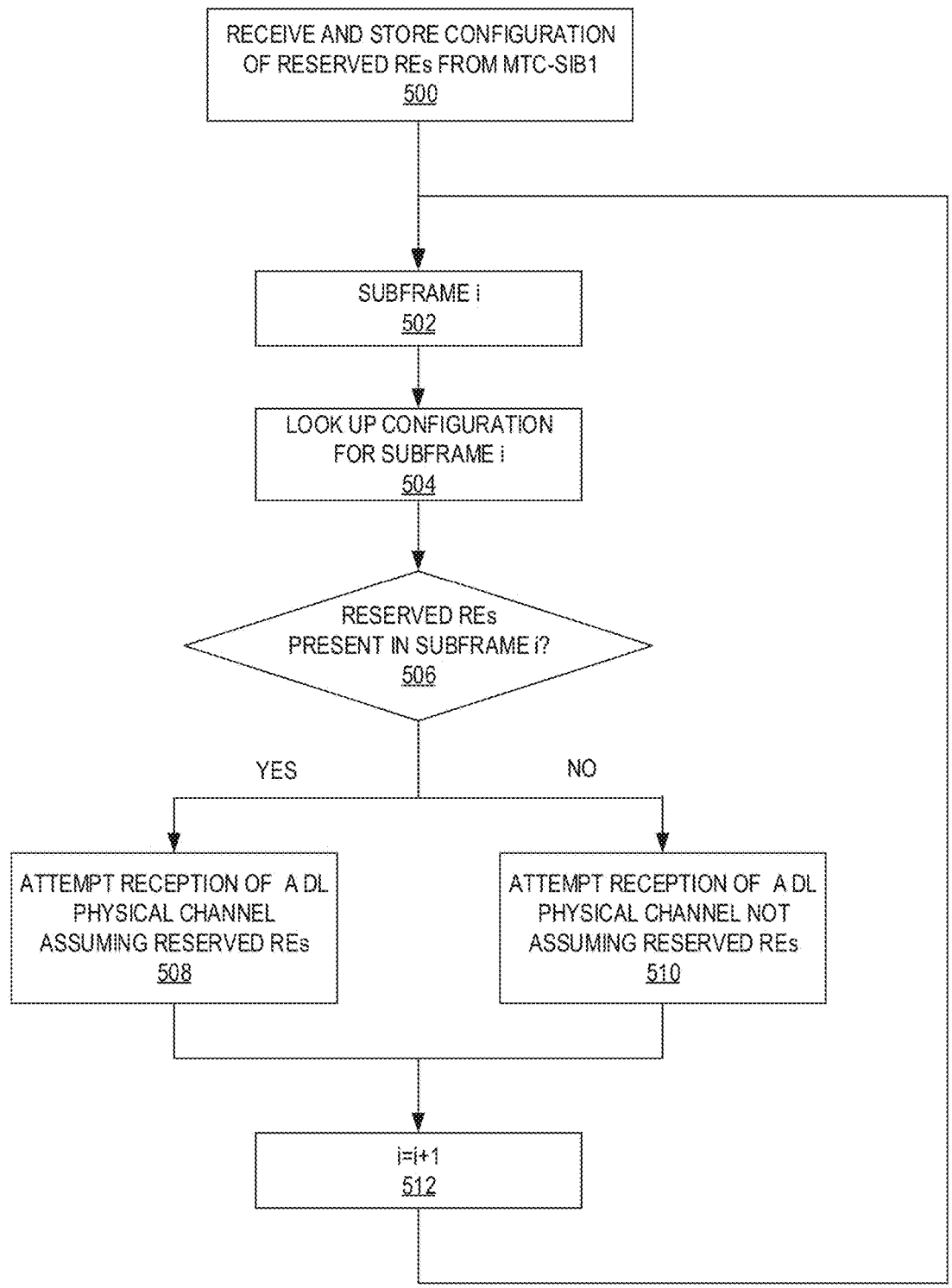
FIG. 14 is a flow chart that illustrates the operation of the wireless device in more detail according to some embodiments of the present disclosure.

FIG. 14 is a flow chart that illustrates the operation of the wireless device 18 in more detail according to some embodiments of the present disclosure. In this example, it is assumed that the configuration of reserved REs is sent via MTC-SIB1. As illustrated, the wireless device 18 receives and stores a configuration of reserved REs from MTC-SIB1 (step 500). For subframe i (step 502), the wireless device 18 looks up the configuration of reserved REs for subframe i from the stored configuration information (step 504). The wireless device 18 determines whether reserved REs are present for subframe i based on the stored configuration information (step 506). If reserved REs are present in subframe i (and potentially if reserved REs are present in the PRB(s) on which downlink reception is to be attempted), the wireless device 18 attempts reception of a downlink physical channel (i.e., a downlink transmission) (e.g., an EPDCCH or PDSCH) assuming reserved REs are present (step 508). Otherwise, if reserved REs are not present, the wireless device 18 attempts reception of the downlink physical channel assuming that reserved REs are not present (step 510). The subframe index i is then incremented (step 512), and the process returns to step 502 and is repeated for the next subframe.

Although the described solutions may be implemented in any appropriate type of telecommunication system supporting any suitable communication standards and using any suitable components, particular embodiments of the described solutions may be implemented in an LTE network, such as that illustrated in FIG. 9. As described above, the example network may include one or more instances of wireless (communication) devices (e.g., conventional UEs, MTC/Machine-to-Machine (M2M) UEs, etc.) and one or more radio access nodes (e.g., eNBs or other base stations) capable of communicating with these wireless communication devices along with any additional elements suitable to support communication between wireless communication devices or between a wireless communication device and another communication device (such as a landline telephone).

Figure 15:
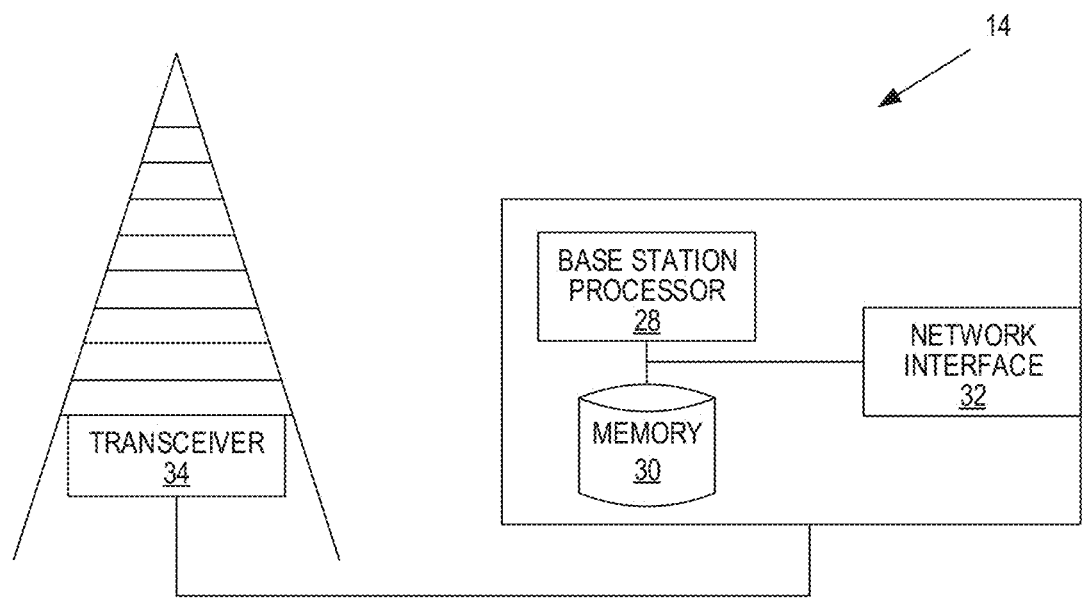
FIG. 15 is a block diagram of a base station, or more generally a radio access node, according to some embodiments of the present disclosure.

Similarly, although the illustrated base station 14 (or more generally radio access node) may represent network nodes that include any suitable combination of hardware and/or software, these nodes may, in particular embodiments, represent devices such as the example radio access node illustrated in greater detail by FIG. 15. As shown in FIG. 15, the example base station 14 (or more generally radio access node) includes hardware components such as a processor 28 (e.g., one or more of a Central Processing Unit (CPU), Application Specific Integrated Circuit (ASIC), Field Programmable Gate Array (FPGA), and/or the like), memory 30, a network interface 32, and a transceiver 34 (which may include transmitters and/or receivers), and an antenna(s) (not labelled). In particular embodiments, some or all of the functionality described above as being provided by a base station 14 or eNB and/or any other type of network node may be provided by the processor 28 executing instructions stored on a computer-readable medium, such as the memory 30. Alternative embodiments of the base station 14 (or radio access node) may include additional components responsible for providing additional functionality, including any of the functionality identified above and/or any functionality necessary to support the solution described above.

In some embodiments, the base station 14 (e.g., eNB) can be configured to transmit the system information broadcast message, which may broadcast the CSI-RS occupation information (reserved RE) so that the common messages may be received while taking into account the presence of CSI-RS. This is also applicable to EPDCCH UE-specific search space, before the RRC configuration of CSI-RS is received. The base station 14 (e.g., eNB) can additionally or alternatively transmit an OCC indictor that indicates the presence of reserved REs for either a distributed or localized physical control channel (e.g., EPDCCH) or a physical shared channel (e.g., PDSCH), as described above.

Figure 16:
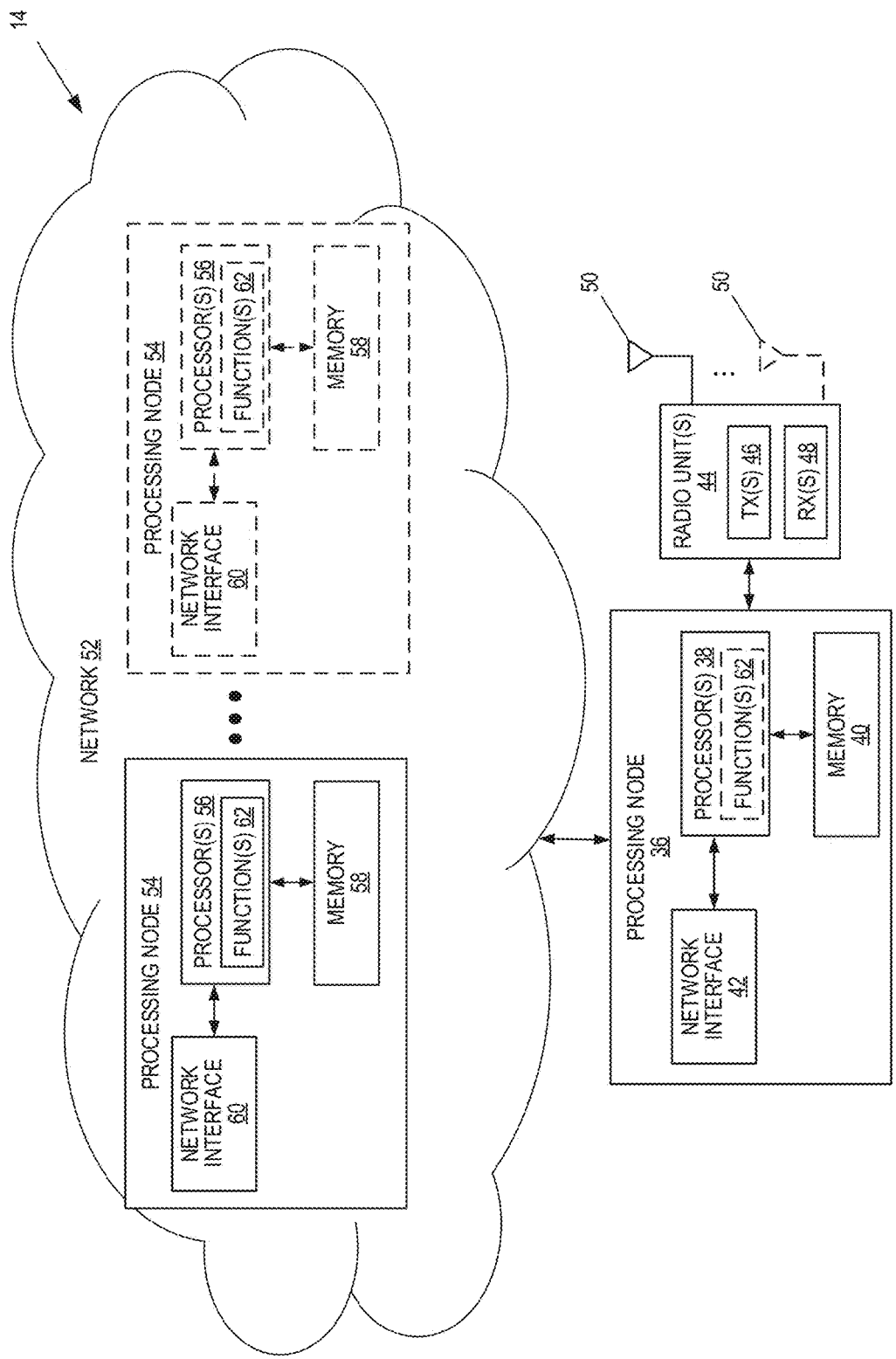
FIG. 16 is a block diagram of a virtualized embodiment of a radio access node according to some embodiments of the present disclosure.

FIG. 16 is a schematic block diagram that illustrates a virtualized embodiment of the base station 14 according to some embodiments of the present disclosure. This discussion is equally applicable to other types of radio access nodes. Further, other types of network nodes may have similar architectures (particularly with respect to including processor(s), memory, and a network interface).

As used herein, a "virtualized" radio access node is a radio access node in which at least a portion of the functionality of the base station 14 is implemented as a virtual component (e.g., via a virtual machine(s) executing on a physical processing node(s) in a network(s)). As illustrated, the base station 14 includes a processing node 36 that includes one or more processors 38 (e.g., CPUs, ASICs, FPGAs, and/or the like), memory 40, and a network interface 42 as well as one or more radio units 44 that each includes one or more transmitters 46 and one or more receivers 48 coupled to one or more antennas 50. The processing node 36 is connected to the radio unit(s) 44 via, for example, an optical cable or the like. The processing node 36 is connected to one or more processing nodes 54 coupled to or included as part of a network(s) 52 via the network interface 42. Each processing node 54 includes one or more processors 56 (e.g., CPUs, ASICs, FPGAs, and/or the like), memory 58, and a network interface 60. Note that the processor(s) 38, the memory 40, and the network interface 42 of FIG. 16 correspond to the processor 28, the memory 30, and the network interface 32 of FIG. 15. Similarly, the transmitter(s) 46 and the receiver(s) 48 of FIG. 16 correspond to the transceiver 34 of FIG. 15.

In this example, functions 62 of the base station 14 described herein are implemented at the one or more processing nodes 54 or distributed across the processing node 36 and the one or more processing nodes 54 in any desired manner. In some particular embodiments, some or all of the functions 62 of the base station 14 described herein are implemented as virtual components executed by one or more virtual machines implemented in a virtual environment(s) hosted by the processing node(s) 54. As will be appreciated by one of ordinary skill in the art, additional signaling or communication between the processing node(s) 54 and the processing node 36 is used in order to carry out at least some of the desired functions such as, for example, transmitting the grant and/or transmitting the indication of the carrier mode of at least one carrier. Notably, in some embodiments, the processing node 36 may not be included, in which case the radio unit(s) 44 communicate directly with the processing node(s) 54 via an appropriate network interface(s).

Figure 17:
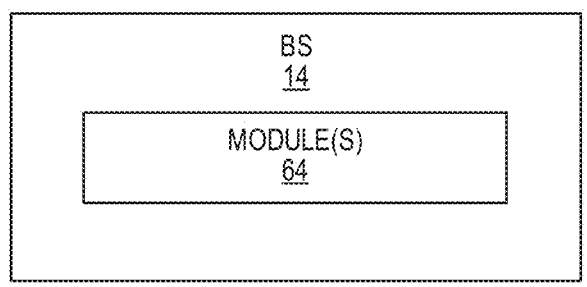
FIG. 17 is a block diagram of a base station, or more generally a radio access node, according to some other embodiments of the present disclosure.

FIG. 17 illustrates the base station 14 (or more generally radio access node) according to some other embodiments of the present disclosure. As illustrated, the base station 14 includes one or more modules 64, each of which is implemented in software. For example, the base station 14 may include a reserved RE indicator transmission module that operates to transmit, e.g., either an OCC indicator or a broadcast indicator, as described above, via an associated transmitter(s) (not shown) of the base station 14. The base station 14 also includes a physical channel transmission module that operates to transmit a physical channel (e.g., an EPDCCH or a PDSCH), as described above, via an associated transmitter(s) (not shown) of the base station 14.

In some embodiments, a computer program including instructions which, when executed by at least one processor, causes the at least one processor to carry out the functionality of base station 14 or eNB according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as the memory 30).

Figure 18:
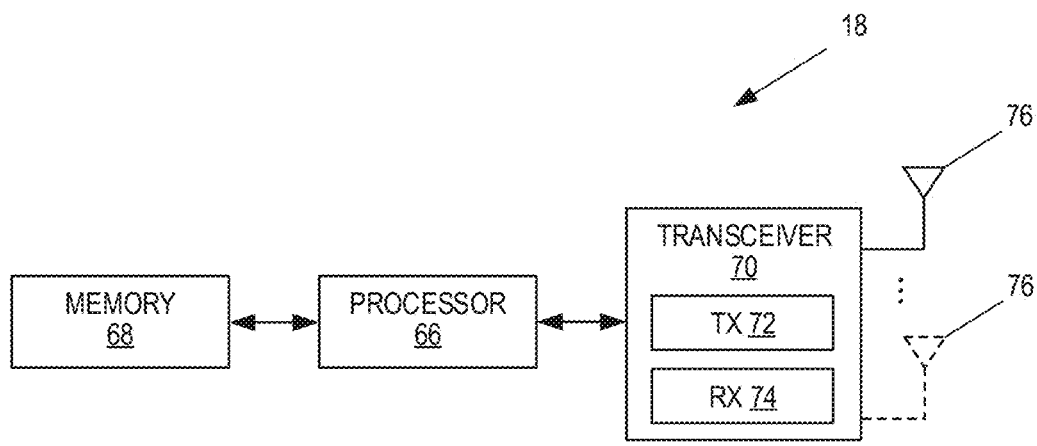
FIG. 18 is a block diagram of a wireless device according to some embodiments of the present disclosure.

Although the illustrated wireless device 18 may represent communication devices that include any suitable combination of hardware and/or software, these wireless devices 18 may, in particular embodiments, represent devices such as the example wireless device 18 (e.g., UE) illustrated in greater detail by FIG. 18. As shown in FIG. 18, the example wireless device 18 includes a processor 66 (e.g., one or more of a CPU, ASIC, FPGA, and/or the like), memory 68, a transceiver 70 (which includes a transmitter 72 and a receiver 74), and an antenna(s) 76. In particular embodiments, some or all of the functionality described above as being provided by the wireless device 18, UEs, MTC, or M2M devices, and/or any other types of wireless devices may be provided by the processor 66 executing instructions stored on a computer-readable medium, such as the memory 68 shown in FIG. 18. Alternative embodiments of the wireless device 18 may include additional components beyond those shown in FIG. 18 that may be responsible for providing certain aspects of the device's functionality, including any of the functionality described above and/or any functionality necessary to support the solution described above.

Figure 19:
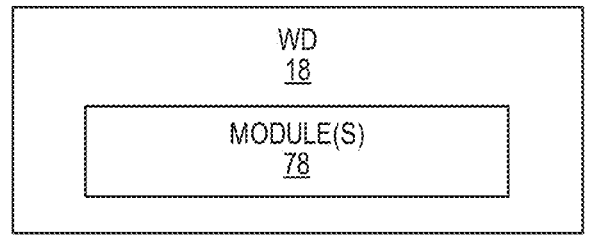
FIG. 19 is a block diagram of a wireless device according to some other embodiments of the present disclosure.

As described above, the wireless device 18 (e.g., UE) can include structural elements, such as processor circuitry, transceiver circuitry, memory circuitry, and other hardware components used to carry out the embodiments described herein. The wireless device 18 (e.g., UE) can also include functional modules 78, as illustrated in FIG. 19. For example, the wireless device 18 may include a receiver module for receiving information (e.g., an OCC indicator or a broadcast indicator, as described above) about the reserved REs, a module for determining whether a subframe includes reserved REs based on the received information/indicator, and a module for receiving (or attempting to receive) a physical channel (e.g., EPDCCH or PDSCH) according to whether reserved REs are determined to be present, as described above.

The following acronyms are used throughout this disclosure.

3GPP Third Generation Partnership Project
5G Fifth Generation
ASIC Application Specific Integrated Circuit
CN Core Network
CP Cyclic Prefix
CPU Central Processing Unit
CSI-RS Channel State Information Reference Signal
DCI Downlink Control Information
DMRS Demodulation Reference Signal
eCCE Enhanced Control Channel Element
eNB Enhanced or Evolved Node B
EPDCCH Enhanced Physical Downlink Control Channel
eREG Enhanced Resource Element Group
FPGA Field Programmable Gate Array
LTE Long Term Evolution
M2M Machine-to-Machine
MBMS Multimedia Broadcast/Multicast Service
MCS Modulation and Coding Scheme
MHz Megahertz
MIB Master Information Block
MME Mobility Management Entity
ms Millisecond
MTC Machine Type Communication
OCC Orthogonal Cover Code
OFDM Orthogonal Frequency Division Multiplexing
PDCCH Physical Downlink Control Channel
PDN Packet Data Network
PDSCH Physical Downlink Shared Channel
P-GW Packet Data Network Gateway
PRB Physical Resource Block
PSM Power Saving Mode
RAN Radio Access Network
RAR Random Access Response
RB Resource Block
RE Resource Element
Rel-8 Release 8
Rel-11 Release 11

Rel-12 Release 12
Rel-13 Release 13
RF Radio Frequency
RRC Radio Resource Control
RS Reference Signal
SCEF Service Capability Exposure Function
S-GW Serving Gateway
SIB Secondary Information Block
SIM Subscriber Identification Module
TDD Time Division Duplexing
TS Technical Specification
UE User Equipment Those skilled in the art will recognize improvements and modifications to the embodiments of the present disclosure. All such improvements and modifications are considered within the scope of the concepts disclosed herein and the claims that follow.

What is claimed is:

1. A radio access node for a cellular communications network, comprising:
   a transceiver;
   a processor; and
   memory storing instructions executable by the processor whereby the radio access node is operable to:
      transmit, via the transceiver, a downlink transmission to a wireless device using one or more Physical Resource Blocks, PRBs, that comprise reserved Resource Elements, REs, by puncturing the downlink transmission at positions of the reserved REs, the downlink transmission being a Physical Downlink Shared Channel, PDSCH, transmission, wherein the radio access node is further operable to transmit the downlink transmission at a reduced code rate when puncturing of the downlink transmission at positions of the reserved REs has occurred.

2. The radio access node of claim 1 wherein the reserved REs are REs utilized for one or more Channel State Information Reference Signals, CSI-RSs.

3. A method of operation of a radio access node in a cellular communications network, comprising:
   transmitting a downlink transmission to a wireless device using one or more Physical Resource Blocks, PRBs, that comprise reserved Resource Elements, REs, by puncturing the downlink transmission at positions of the reserved REs, the downlink transmission being a Physical Downlink Shared Channel, PDSCH, transmission, wherein the transmitting the downlink transmission to the wireless device comprises transmitting the downlink transmission at a reduced code rate when puncturing of the downlink transmission at positions of the reserved REs has occurred.

4. The method of claim 3 wherein the reserved REs are REs utilized for one or more Channel State Information Reference Signals, CSI-RSs.

5. A non-transitory computer-readable medium storing software instructions that when executed by one or more processors of a radio access node cause the radio access node to:
   transmit a downlink transmission to a wireless device using one or more Physical Resource Blocks, PRBs, that comprise reserved Resource Elements, REs, by puncturing the downlink transmission at positions of the reserved REs, the downlink transmission being a Physical Downlink Shared Channel, PDSCH, transmission, wherein the radio access node is caused to transmit the downlink transmission at a reduced code rate when puncturing of the downlink transmission at positions of the reserved REs has occurred.

6. A wireless device enabled to operate in a cellular communications network, comprising:
   a transceiver;
   a processor; and
   memory storing instructions executable by the processor whereby the wireless device is operable to:
      receive, via the transceiver, a downlink transmission from a radio access node on one or more Physical Resource Blocks, PRBs, based on an assumption by the wireless device that the downlink transmission on the one or more PRBs is punctured by reserved Resource Elements, REs, if any, the downlink transmission being a Physical Downlink Shared Channel, PDSCH, transmission, wherein the wireless device is further operable to receive the downlink transmission from the radio access node at a reduced code rate when puncturing of the downlink transmission at positions of the reserved REs has occurred.

7. The wireless device of claim 6 wherein the reserved REs are REs utilized for one or more Channel State Information Reference Signals, CSI-RSs.

8. A method of operation of a wireless device in a cellular communications network, comprising:
   receiving a downlink transmission from a radio access node on one or more Physical Resource Blocks, PRBs, based on an assumption by the wireless device that the downlink transmission on the one or more PRBs is punctured by reserved Resource Elements, REs, if any, the downlink transmission being a Physical Downlink Shared Channel, PDSCH, transmission, wherein receiving the downlink transmission from the radio access node further comprises receiving the downlink transmission from the radio access node at a reduced code rate when puncturing of the downlink transmission at positions of the reserved REs has occurred.

9. The method of claim 8 wherein the reserved REs are REs utilized for one or more Channel State Information Reference Signals, CSI-RSs.

10. A non-transitory computer-readable medium storing software instructions that when executed by one or more processors of a wireless device cause the wireless device to:
    receive a downlink transmission from a radio access node on one or more Physical Resource Blocks, PRBs, based on an assumption by the wireless device that the downlink transmission on the one or more PRBs are punctured by reserved Resource Elements, REs, if any, the downlink transmission being a Physical Downlink Shared Channel, PDSCH, transmission, wherein the wireless device is caused to receive the downlink transmission from the radio access node at a reduced code rate when puncturing of the downlink transmission at positions of the reserved REs has occurred.

11. A method of operation of a wireless device in a cellular communications network, comprising:
    obtaining an indicator that is indicative of whether reserved Resource Elements, REs, are present in a subframe in which a downlink transmission is transmitted from a radio access node to the wireless device, the downlink transmission being one of a group consisting of: an Enhanced Physical Downlink Control Channel, EPDCCH, transmission or a Physical Downlink Shared Channel, PDSCH, transmission;
    determining whether reserved REs are present in the subframe based on the indicator; and upon determining that reserved REs are present in the subframe, attempting reception of the downlink transmission based on an assumption that reserved REs are present in the subframe.

12. The method of claim 11 further comprising, upon determining that reserved REs are not present in the subframe, attempting reception of the downlink transmission based on an assumption that reserved REs are not present in the subframe.

13. The method of claim 11 wherein the downlink transmission is an EPDCCH transmission.

14. The method of claim 13 wherein the reserved REs are REs utilized for one or more Channel State Information Reference Signals, CSI-RSs.

15. The method of claim 11 wherein the downlink transmission is a PDSCH transmission.

16. The method of claim 15 wherein the reserved REs are REs utilized for one or more Channel State Information Reference Signals, CSI-RSs.

17. The method of claim 11 wherein obtaining the indicator comprises detecting an Orthogonal Cover Code, OCC, indicator in the subframe that is indicative of whether reserved REs are present in the subframe.

18. The method of claim 17 wherein the OCC indicator is an OCC utilized for a Demodulation Reference Signal, DMRS, antenna port within one or more Physical Resource Blocks (PRBs).

19. The method of claim 17 wherein the OCC indicator is further indicative of which of a plurality of predefined sets of reserved REs is present in the subframe.

20. The method of claim 17 wherein positions of the reserved REs within the subframe are predefined.

21. The method of claim 11 wherein obtaining the indicator comprises receiving and storing a configuration of reserved REs in multiple subframes, including the subframe, from received system information, the configuration of reserved REs in the multiple subframes comprising the indicator that is indicative of whether reserved REs are present in the subframe.

22. The method of claim 21 wherein the wireless device is a Machine Type Communication, MTC, device, and the received system information is a MTC Master Information Block, MTC-MIB.

23. The method of claim 21 wherein the wireless device is a Machine Type Communication, MTC, device, and the received system information is a MTC Secondary Information Block, MTC-SIB.

24. The method of claim 11 wherein attempting reception of the downlink transmission based on an assumption that reserved REs are present in the subframe comprises de-mapping a plurality of REs corresponding to the downlink transmission from one or more Physical Resource Blocks, PRBs, in the subframe.

25. The method of claim 11 wherein attempting reception of the downlink transmission based on an assumption that reserved REs are present in the subframe comprises ignoring the reserved REs during reception of the downlink transmission.

26. A wireless device enabled to operate in a cellular communications network, comprising:
a transceiver;
a processor; and
memory storing instructions executable by the processor whereby the wireless device is operable to:
obtain an indicator that is indicative of whether reserved Resource Elements, REs, are present in a subframe in which a downlink transmission is transmitted from a radio access node to the wireless device, the downlink transmission being one of a group consisting of: an Enhanced Physical Downlink Control Channel, EPDCCH, transmission or a Physical Downlink Shared Channel, PDSCH, transmission;
determine whether reserved REs are present in the subframe based on the indicator; and
upon determining that reserved REs are present in the subframe, attempt reception of the downlink transmission based on an assumption that reserved REs are present in the subframe.

27. The wireless device of claim 26 wherein, in order to obtain the indicator, the wireless device is further operable to detect an orthogonal cover code, OCC, indicator in the subframe that is indicative of whether reserved REs are present in the subframe.

28. The wireless device of claim 26 wherein, in order to obtain the indicator, the wireless device is further operable to receive and store a configuration of reserved REs in multiple subframes, including the subframe, from received system information, the configuration of reserved REs in the multiple subframes comprising the indicator that is indicative of whether reserved REs are present in the subframe.

29. A non-transitory computer-readable medium storing software instructions that when executed by one or more processors of a wireless device cause the wireless device to:
obtain an indicator that is indicative of whether reserved Resource Elements, REs, are present in a subframe in which a downlink transmission is transmitted from a radio access node to the wireless device, the downlink transmission being one of a group consisting of: an Enhanced Physical Downlink Control Channel, EPDCCH, transmission or a Physical Downlink Shared Channel, PDSCH, transmission;
determine whether reserved REs are present in the subframe based on the indicator; and
upon determining that reserved REs are present in the subframe, attempt reception of the downlink transmission based on an assumption that reserved REs are present in the subframe.

30. The radio access node of claim 1 wherein the radio access node is operable to repeat the downlink transmission to the wireless device a predetermined number of times when puncturing of the downlink transmission at positions of the reserved REs has occurred.

31. The method of claim 3 further comprising repeating the transmission of the downlink transmission to the wireless device a predetermined number of times when puncturing of the downlink transmission at positions of the reserved REs has occurred.

32. The wireless device of claim 6 wherein the wireless device is further operable to receive multiple repetitions of the downlink transmission from the radio access node when puncturing of the downlink transmission at positions of the reserved REs has occurred.

33. The method of claim 8 further comprising receiving the downlink transmission from the radio access node a predetermined number of times when puncturing of the downlink transmission at positions of the reserved REs has occurred.

* * * * *